(12) United States Patent
Fruhauf et al.

(10) Patent No.: US 6,883,715 B1
(45) Date of Patent: *Apr. 26, 2005

(54) MULTI-MODE SMART CARD, SYSTEM AND ASSOCIATED METHODS

(75) Inventors: Serge F. Fruhauf, Saratoga, CA (US); Alain Christophe Pomet, Austin, TX (US); Robert Antoine Leydier, La Londe las Maurez (FR)

(73) Assignees: STMicroelectronics, Inc., Carrollton, TX (US); Schlumberger Malco, Inc., Owings Mills, MD (US)

( * ) Notice: Subject to any disclaimer, the term of this patent is extended or adjusted under 35 U.S.C. 154(b) by 863 days.

This patent is subject to a terminal disclaimer.

(21) Appl. No.: 09/686,327

(22) Filed: Oct. 11, 2000

(51) Int. Cl.$^7$ ............................................... G06K 19/06
(52) U.S. Cl. ..................................... 235/492; 235/441
(58) Field of Search ............................. 235/492, 441, 235/487, 486, 493, 380, 383, 385, 384, 382, 382.5; 705/1; 710/2, 72, 104, 105

(56) References Cited

U.S. PATENT DOCUMENTS

| | | | |
|---|---|---|---|
| 5,847,372 A | | 12/1998 | Kreft ............................ 235/492 |
| 6,101,477 A | * | 8/2000 | Hohle et al. .................... 705/1 |
| 6,151,647 A | * | 11/2000 | Sarat ............................ 710/301 |
| 6,168,077 B1 | | 1/2001 | Gray et al. ................... 235/375 |
| 6,199,128 B1 | * | 3/2001 | Sarat ............................ 710/301 |
| 6,439,464 B1 | * | 8/2002 | Fruhauf et al. ............. 235/492 |
| 2003/0206547 A1 | * | 11/2003 | Cho ............................ 370/364 |

FOREIGN PATENT DOCUMENTS

| | | | |
|---|---|---|---|
| WO | 99/49415 | 9/1999 | .......... G06K/19/00 |

* cited by examiner

Primary Examiner—Thien M. Le
(74) Attorney, Agent, or Firm—Lisa K. Jorgenson; Christopher F. Regan

(57) ABSTRACT

A multi-mode IC is provided for operating in a first mode such as an ISO mode in accordance with International Standards Organization 7816 (ISO 7816) protocol, and a second, non-ISO mode, such as a USB mode in accordance with Universal Serial Bus (USB) protocol. The multi-mode IC is preferably in a smart card and includes a microprocessor and an external interface. The external interface comprises a voltage supply pad, a ground pad, a first set of pads for the first mode, and 2 second set of pads for the second mode. The first set of pads preferably include a reset pad, a clock pad and an input/output pad in accordance with the ISO 7816 protocol, and may also include a variable supply voltage pad in accordance with the ISO 7816 protocol. The IC further includes a mode configuration circuit for detecting a mode condition on one pad of the first set of pads, and configuring the IC in the ISO mode or the non-ISO mode depending on the result. Once the IC is configured in a particular mode, it will operate in only that mode until the next power-on reset sequence.

33 Claims, 26 Drawing Sheets

| ISO CONTACTS | CONVENTIONAL APPLICATIONS | | | | NEW APPLICATIONS | |
|---|---|---|---|---|---|---|
| | I1 | I2 | A1 | A2 | USIC | USC |
| C1 | VCC | VCC | VCC | VCC | VBUS | VBUS |
| C2 | USED | USED | RST | RST | RST | |
| C3 | USED | USED | CLK | CLK | CLK | |
| C4 | USED | USED | | | D+ | D+ |
| C5 | GND | GND | GND | GND | GND | GND |
| C6 | VPP | VPP | VPP | | | |
| C7 | USED | USED | I/O | I/O | I/O | |
| C8 | USED | | | | D- | D- |

FIG. 8.

MULTI-MODE SMART CARD, SYSTEM AND ASSOCIATED METHODS

FIELD OF THE INVENTION

The present invention relates to information processing and storage, and more particularly, to smart card systems.

BACKGROUND OF THE INVENTION

Smart cards (SC) are plastic cards having an embedded Integrated Circuit (IC). That IC may be a logic circuit with its associated memories or a microcontroller with its associated memories and software, or a microcontroller with its associated memories and software coupled to a custom block.

To use the computing power given by the IC, a SC makes use of a full set of packaging technologies. The die size varies from 1 $mm^2$ to 30 $mm^2$. The die size is limited for mechanical aspects going with the plastic nature of the SC. The IC is attached to a lead frame and wire-bonding techniques are used to connect the IC pads to the lead frame contacts. Potting and other strengthening methods protect the IC against chemical and mechanical stresses. Contacts are located on one side of the card and their number is limited to eight. Ultimately SC performs transactions with a SC reader using a serial protocol. All the mechanical and electrical specifications of SC are published by the International Standard Organization (ISO). The ISO7816-X standards have allowed the simple and massively produced magnetic stripe cards to evolve toward the SC. SC, depending of the IC complexity, may perform pre-paid accounting, cryptographic scheme, personal authentication using PIN code or biometrics and run java scripts to name few.

ISO documents ISO 7816-1 Physical Characteristics, ISO 7816-2 Dimensions and Locations of the contacts, ISO 7816-3 Electronic signals and transmission protocols and, ISO 7816-10 Electronic signals and answer to reset for synchronous cards are incorporated herein by reference.

Today all the SC readers have to be recognized by the infrastructure prior to perform any transaction involving a SC. The infrastructure is running an application in which the SC is involved. The SC reader expects a SC. The half duplex protocol between the SC and the SC reader, in which, either the SC sends information to the SC reader or vice versa, cannot start until a SC is detected in place into the SC reader. The infrastructure manages authentication or transactions for pre-paid cards in public telephony, for Bank cards in Point Of Sale (POS) terminals and Automatic Teller Machines (ATM), for Pay TV providers in set top boxes and for wireless telecom operators in Subscriber Identification Modules (SIM) in Global System for Mobile (GSM) terminals. Except for SIM cards, all others applications use a physical sensor to detect the SC. This sensor tells the SC reader when a SC is in place that is when the SC lead frame contacts are able to mate with the SC reader contacts. Two sorts of SC reader contacts can be used, contacts that remain in place and because of their elasticity can slide over the SC when inserted in the SC reader or mobile contacts which descend to touch the lead frame contacts once the card has been detected in place. When the SC reader has established that a SC is in place the power up sequence can start at the SC reader convenience. After the power up sequence, the SC reader will provide first a clock to the SC and then will release its reset signal. The SC is then able to execute the stored Operating System (OS). The SIM card is particular since it is put in place only once with the power off and used constantly subsequently to its positioning.

The first application ever to have deployed the SC technology more than 20 years ago is the public telephone system. The die size used in this application is less than 1 $mm^2$. Just memories and logic circuits are integrated in the IC. In 1999, Pre-paid SC accounted for more than ⅔ of the 1.3 billion SCs produced worldwide. The SC reader utilizes all eight contacts to interface properly with the different SC generations. When a SC is inserted in the payphone, the telephone infrastructure authenticates the SC and the telephone remove units out of the SC. It is worth noting that the SC developed for Banking applications can be utilized in a payphone. The payphone does not remove units out of a Bank card but bills the SC carrier.

The second largest application using the SC has been deployed by the Banking industry. The ATM and POS infrastructures have been installed in most countries other than the USA. The die size used in this application is about 10 $mm^2$. A microcontroller and its associated memories and software are integrated in the IC. The SC reader utilizes up to six contacts to interface properly with the different SC generations. When a SC is inserted in the ATM or the POS, the SC carrier is asked to authenticate himself with a PIN code. The SC can store anything like the balance of cash the owner got out of an ATM on a per week basis, the details of purchases he has done since the last closing date, etc. Based on this information, the authorization can be issued on the spot once the PIN has authenticated the debtor without any telephone calls to the bank. Ultimately Banks and Businesses perform the equalization using the telephone, private communication networks and some day the Internet. While performing the equalization, a black list of fraudulent SC may be stored in the POS or ATM. This scheme has been able to reduce the fraud level down to 0.02% of all the transactions equivalent money done with the SC from 0.2% when no IC was embedded in the card. The level of fraud using SC has been reduced by ten fold compared to the regular credit cards.

The third largest application using SCs has been deployed by GSM manufacturer. The die size used in a SIM is about 30 $mm^2$. A microcontroller and its associated memories and software are integrated in the IC. The SIM reader utilizes five contacts to interface properly with the SC. The most sophisticated SC applications are performed in GSM using Java applets.

A whole new market for the SC is now emerging with the Internet accessed from a Personnel Computer. Secure message, Public Key Infrastructure, Authentication and Electronic Payment are the new SC hot areas. The SC can be an e-commerce facilitator. The differentiation of the smart-card compared to other solutions is to have the PIN in the memory that is never communicated in any transaction.

Up to now, the SC is used in a SC reader connected to the computer. Two protocols are involved in supporting transactions between the SC and the application run by the computer. The first protocol complies with the ISO-7816-3. This standard provides detailed requirements for the serial interface between SC and SC reader. The reader is connected to the computer by via a Serial Port, a Parallel Port or even the Universal Serial Bus [USB] using a second protocol. The SC reader contains electronic circuits and embedded software that enable communication between the SC using the first protocol and the computer using the second protocol. The computer is loaded with the appropriate driver to support the SC reader. Many countries have started to use the SC in the PC environment. The die size used in this application will be anywhere from 5 $mm^2$ to 30 $mm^2$. A microcontroller and its associated memories and software are integrated in the IC with a cryptocontroller. Sometimes, a bio-sensor will be also integrated. The SC reader utilizes at least five contacts to interface properly with the SC.

Closed infrastructures enabling all kinds of transactions like Healthcare, Public phone, parking, Loyalty programs, Cash payments, Credit payments are using millions of ISO compliant SC readers around the world. Europe has lead the development of these technologies back in the late 1970's. In these proprietary infrastructures, every single SC reader is designed to carry many transactions each hour. The many users share the cost of the SC reader.

The extreme growths of the e-commerce and Internet transactions have highlighted the huge needs to secure transactions. Fraud is booming. False credit card numbers are used, credit card numbers are stolen and eavesdropping on the Internet is well established. Dotcom companies search for the device having the best cost/performance ratio. The SC is an excellent contender if the SC reader price can be reduced.

The USB has recently become firmly established and has gained wide acceptance in the Personal Computer (PC) marketplace. The USB has been developed in response to a need for a standard interface that extends the concept of "plug and play" to devices external to a PC. It has enabled users to install and remove external peripheral devices without having to open the PC case or to remove power from the PC. The USB provides a low-cost, high performances, half-duplex serial interface that is easy to use and readily expandable. The USB can be seen as a set of four wires carrying the power supply with two wires and data with the two other wires. The USB is currently defined by the Universal Serial Bus Specification written and controlled by USB Implementers Forum, Inc., a non-profit corporation founded by the group of companies that developed the USB Specification.

In particular, Chapter 5 USB Data Flow Model, Chapter 7 Electrical, Chapter 8 Protocol Layer and Chapter 9 USB Device Framework of Universal Serial Bus Specification are incorporated herein by reference. The increasingly widespread-use of the USB in computers has led SC reader manufacturers to develop USB interfaces for connection of their products to computers to complement the existing serial and parallel interfaces.

We are now in a situation where the brick and mortar companies and the Banks have been using the SC technology for more than 15 years. On the other hand, the Internet, a formidable arena to enhance commerce and Banking activities, does not use the SC technology. Most of the Internet transactions are done from a PC and despite PC manufacturer efforts, the PC industry has failed to install on each PC a cost effective SC reader meeting the specific needs of web related applications. A comprehensive solution, servicing the needs of both the one already engaged in the SC technologies and those wishing to benefit from it, is to be found. These two fields should share a common authentication platform in the best interests of the customers and the service providers.

An example of a conventional approach may be found in published PCT application WO 99/49415 and entitled "Versatile Interface Smart Card." The system discloses a smart card system which can be used with different protocols. Specifically, the system provides a mode signal at one of the non-ISO standard contacts to indicate the protocol of the device that the card is communicating with. However, the mode signal is not checked until after the smart card is powered up and the reset signal has been applied. In other words, the smart card is already operating in the ISO 7816 protocol, and upon detection of the mode signal, may have to switch to a non-ISO protocol.

SUMMARY OF THE INVENTION

In view of the foregoing background, it is therefore an object of the invention to provide an integrated circuit which can selectively operate in accordance with more than one protocol.

It is a further object of the invention to provide a smart card system that can determine whether the smart card is communicating with an interface using the ISO 7816 protocol or non-ISO protocol, and configure the smart card in such a protocol.

This and other objects, features and advantages in accordance with the present invention are provided by a multi-mode IC for operating in an ISO mode in accordance with International Standards Organization 7816 (ISO 7816) protocol, and a non-ISO mode, such as a USB mode in accordance with Universal Serial Bus (USB) protocol. The multi-mode IC includes a microprocessor and an external interface. The external interface includes a voltage supply pad, a ground pad, a first set of pads in accordance with the first protocol, such as a reset pad, a clock pad and an input/output pad in accordance with the ISO 7816 protocol, and a second set of pads in accordance with the non-ISO protocol, such as a D-plus pad and a D-minus pad in accordance with the USB protocol. The IC also includes a mode configuration circuit comprising a mode detector connected to one of the pads of the first set of pads, e.g. the clock pad, a USB voltage detector connected to the voltage supply pad, a latching circuit connected to the switching block and an receiving output from the mode detector. The IC may also include a control register connected to the latching circuit for storing a mode configuration indicator.

Also, if the non-ISO mode is the USB mode, then the IC may include a USB cable detector connected to D-plus and D-minus pads. Here, the mode configuration circuit configures the IC to operate in one of the ISO and USB modes while disabling the other of the ISO and USB modes, such that the reset, clock and input/output pads are disabled when the switching block is configured in the USB mode, and the D-plus and D-minus pads are disabled when the switching block is configured in the ISO mode. Since an ISO transaction may occur while the power supply voltage is within the range of 2.7 to 5.5 Volts, and a USB transaction may occur while the power supply voltage is within the range of 4.01–5.5 Volts, a voltage detector may be provided to detect whether a power supply voltage on the voltage supply pad can support USB transactions.

A system using such an IC in accordance with the present invention includes an ISO-compliant reader and a non-ISO-compliant reader. Of course the ISO-protocol reader would provide the necessary clock signal at the clock pad of the IC. However, the non-ISO-compliant reader includes a mode indication circuit which provides one of the first set of pads, e.g. the clock pad, with a mode indication signal.

A method aspect of the present invention includes operating a multi-mode smart card in an ISO mode in accordance with International Standards Organization 7816 (ISO 7816) protocol, and a non-ISO mode in accordance with a non-ISO protocol. The multi-mode IC includes an external interface having a voltage supply pad, a first set of pads in accordance with the ISO protocol, and a second set of pads in accordance with the non-ISO protocol. The method comprises detecting whether one of an ISO-mode condition and a non-ISO-mode condition exists on one pad of the first set of pads during a power-on-reset of the multi-mode IC; configuring the multi-mode IC in the ISO mode and disabling the second set of pads when the ISO-mode condition is detected; and configuring the multi-mode IC in the non-ISO mode and disabling the first set of pads when the non-ISO-mode condition is detected. The method may also include verifying the non-ISO mode, when the non-ISO-mode condition is detected, by detecting a non-ISO-mode voltage on the voltage supply pad.

Preferably, the first set of pads comprises a reset pad, a clock pad and an input/output pad in accordance with the ISO 7816 protocol, and detecting whether the ISO-mode or non-ISO-mode condition exists comprises detecting if a signal from one of an ISO-compliant interface and a non-ISO-compliant interface is present on one of the first set of pads, e.g. the clock pad. The non-ISO protocol may comprise the Universal Serial Bus (USB) protocol. Also, the method may include storing a mode configuration indicator for indicating whether the multi-mode IC is configured in the ISO or non-ISO mode.

In the present invention, the IC is configured in the ISO mode if an ISO condition is detected on one pad of the first set of pads, such as the clock pad. A mode indication signal may be provided on the clock pad from a non-ISO-compliant reader. If so, then the IC is configured in the non-ISO mode, such as the USB mode. If the non-ISO mode is detected via the clock pad during the power-on reset sequence, then the USB voltage is verified on the voltage supply pad, then a detection for USB connections to a host may be performed before the IC is configured in the USB mode. The IC is either configured in the ISO or non-ISO mode depending on the signal level at the clock pad during the power-on reset sequence. Once the IC is configured in one mode, it can only operate in that mode and it cannot be changed except via another power-on reset sequence.

BRIEF DESCRIPTION OF THE DRAWINGS

FIG. 8 is a table showing which SC is using which lead frame contacts.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
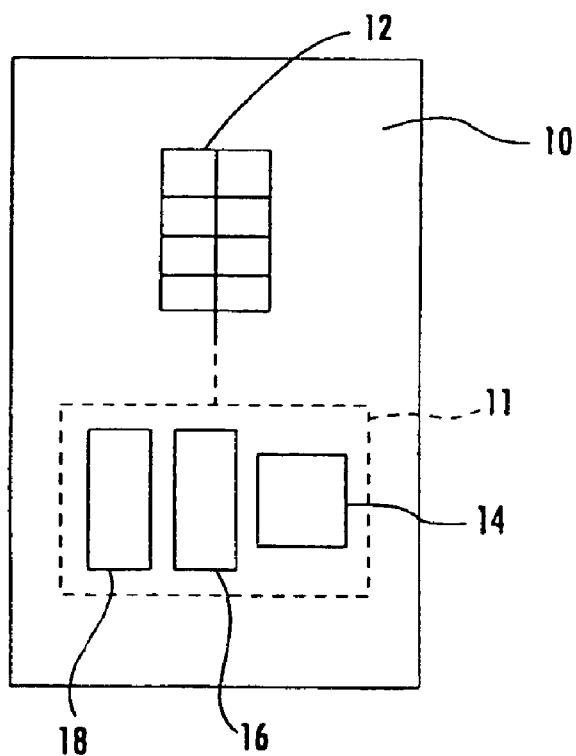
FIG. 1 is a schematic diagram of a smart card according to the present invention.

Referring to FIG. 1, a smart card 10 in accordance with the present invention will now be described. The smart card 10 is made of plastic, for example, and has a plurality of electrical contacts or pads 12 on an outer surface thereof, as would be appreciated by those skilled in the art. As shown, the card 10 includes eight pads 12, for example. The pads 12 are the external interface for the integrated circuit (IC) 11 which is embedded within the card 10 and typically beneath the pads. The size of the card 10 and the position of the pads 12 are determined by appropriate standards such as ISO 7816 discussed above. Of course the IC 11 can also be embedded in other media such as the Subscriber Identity Module (SIM) for mobile phones.

Figure 9:
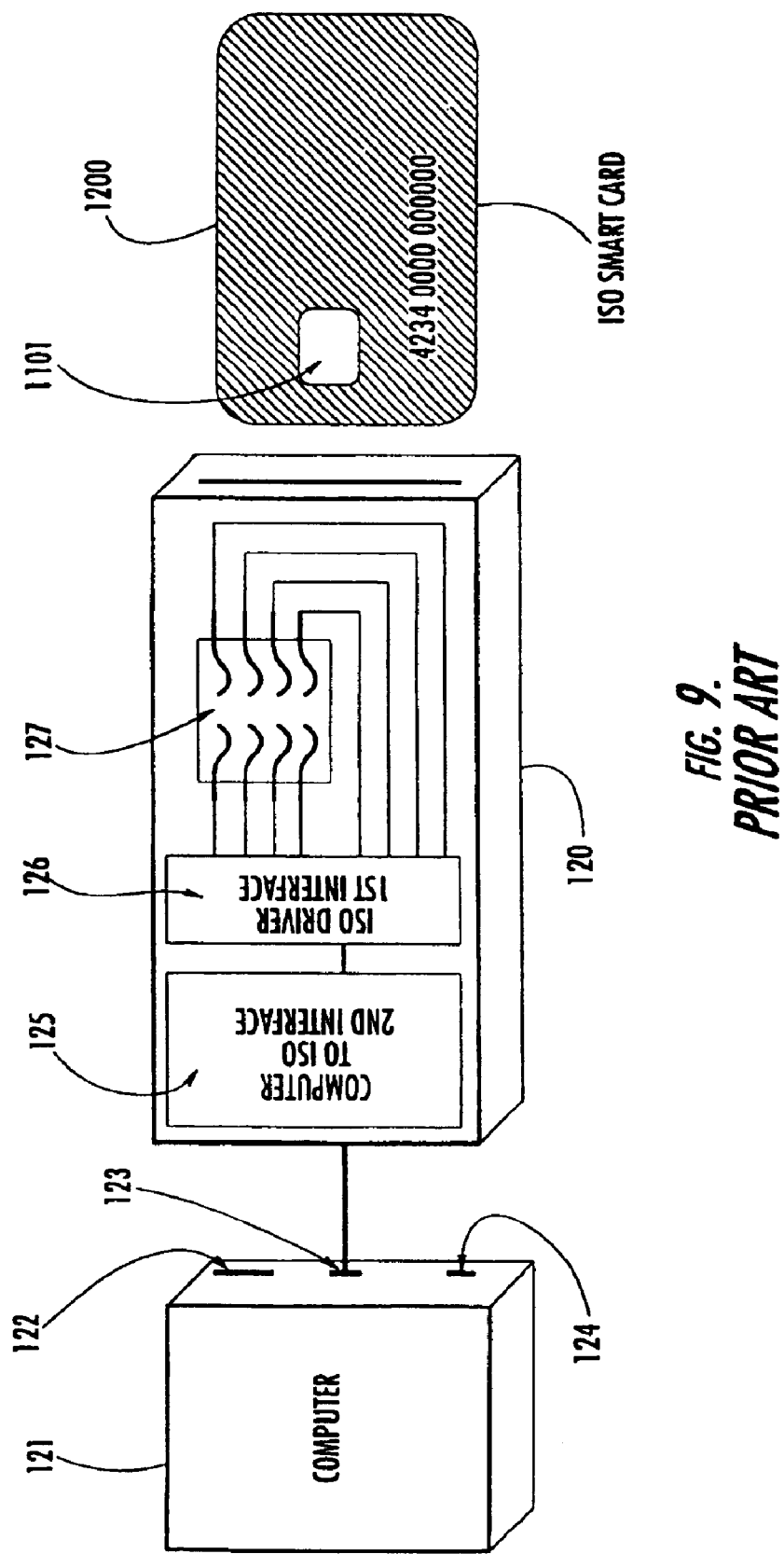
FIG. 9 is a schematic diagram illustrating the prior art ISO SC reader.

A personal computer (PC) 20, as shown in FIG. 9 typically includes a central processing unit (CPU) and various input/output devices such as a monitor, keyboard and a mouse. Additionally, the PC 20 includes a smart card reader 22 which may, for example, be used to control access to the PC. As shown, the smart card reader 22 is a separate peripheral device; however, the smart card reader could also be incorporated into the CPU housing or the keyboard, for example.

The smart card reader 22 may conform to the ISO 7816 protocol or a non-ISO protocol such as the Universal Serial Bus (USB) protocol as discussed above. The ISO 7816 protocol is the conventional standard for use in smart cards and includes a M4 voltage supply pad VCC, a ground pad GND, an input/output pad I/O, a reset pad RST and a clock pad CLK. The ISO protocol is characterized by an Answer-to-Reset (ATR) sequence when a power-on-reset or hardware reset is applied to the IC 11.

The USB protocol is currently being used to replace the different PC 20 interfaces for peripheral devices such as the mouse, keyboard, serial I/O port etc. As discussed above, the USB protocol can be hot plug and play which means that a USB protocol device can be connected or disconnected from the PC 20 without necessitating a reboot. The USB cable includes a voltage supply wire VBUS, a ground wire GND, a D-plus wire D+ or DP and a D-minus wire D− or DM. The differential signal on D+ and D− is a data stream in NRZI coding. The USB 1.1 specification requires the power supply of a USB device to be between 4.01V and 5.5V.

Figure 3:
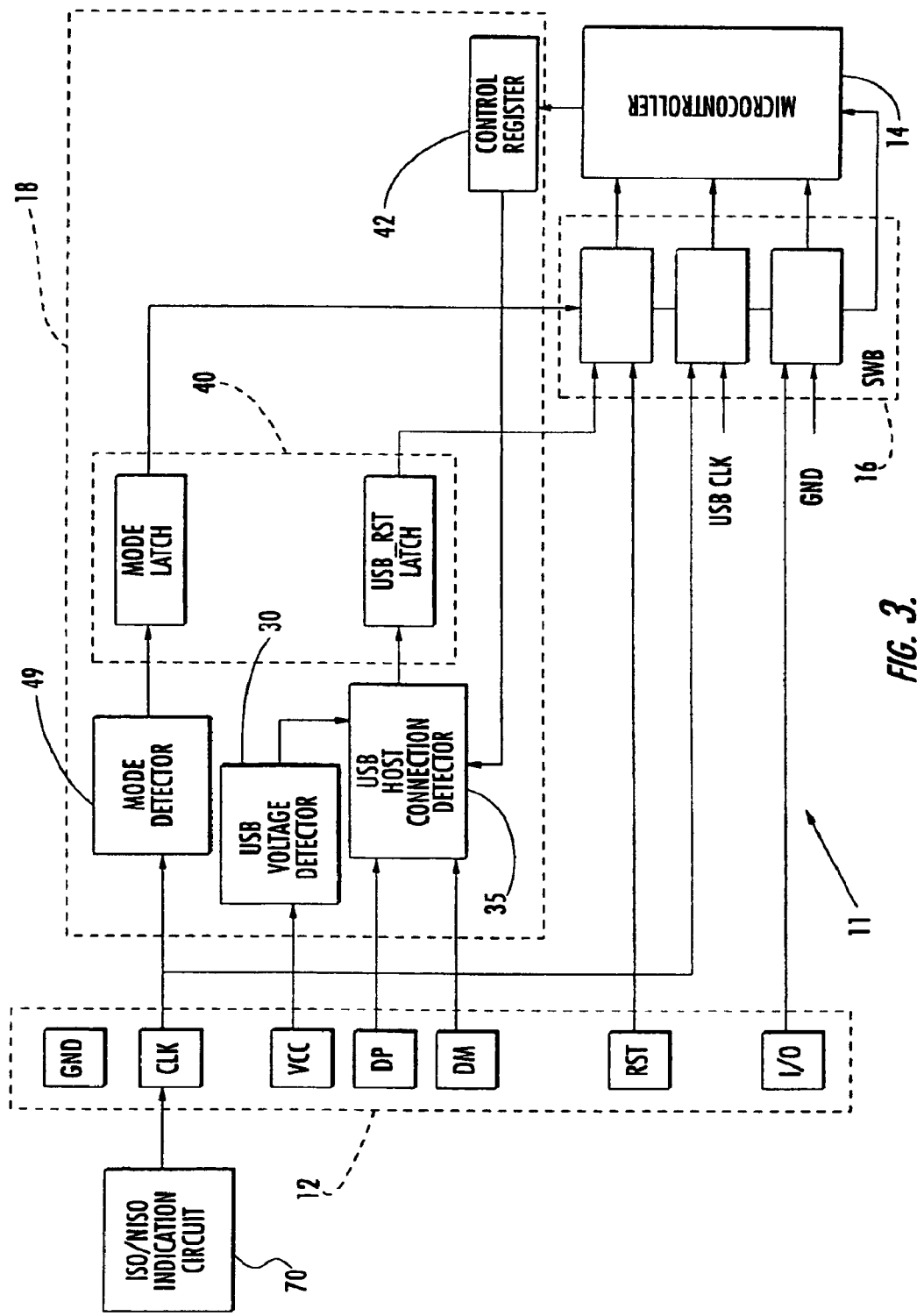
FIG. 3 is a schematic diagram of a multi-mode IC and smart card system according to the present invention.

As set forth previously, it is desirable to provide a smart card system that can operate in the ISO 7816 protocol and another non-ISO protocol, such as the USB protocol, depending on the type of reader the card is communicating with. Thus, referring to FIG. 3, an embodiment of the present invention will be described. A multi-mode IC 11 is capable of operating in first mode such as an ISO mode in accordance with International Standards Organization 7816 (ISO 7816) protocol, and a second non-ISO mode such as a USB mode in accordance with Universal Serial Bus (USB) protocol. The multi-mode IC 11 operates selectively in one mode or the other, but not both simultaneously.

The multi-mode IC 11 is preferably in the smart card 10 and includes a microprocessor 14, a switching block 16, and the external interface 12. The external interface 12 comprises a voltage supply pad VCC, a reference voltage/ground pad GND, a first set of pads for the ISO mode, and a second set of pads for the non-ISO mode. The first set of pads preferably include a reset pad RST, a clock pad CLK and an input/output I/o pad in accordance with the ISO 7816 protocol. The second set of pads preferably includes a D-plus pad D+ and a D-minus pad D− in accordance with the USB protocol.

Because the IC 11 can only operate in one of the two modes which have different external interfaces, the IC will need to determine in which mode to operate. Thus, the IC 11 includes a mode configuration circuit 18 comprising a mode detector 49 connected to one of the ISO pads, such as the clock pad CLK. The mode configuration circuit 18 may also include a USB voltage detector 30 connected to the voltage supply pad VCC for detecting a non-ISO mode voltage supply such as the USB voltage, a latching circuit 40 connected to the switching block and receiving outputs from the mode detector 49 and a USB host connection detector 35, for storing a mode configuration indicator and the USB_RST starting signal.

At least for the case where the non-ISO mode is the USB mode, the mode configuration circuit 18 may include the USB host connection detector 35 connected to the D-plus and D-minus pads, and providing an output to the latching circuit 40. The USB host connection detector 35 may be used to verify that the medium including the IC 11 is actually connected to a USB port once the IC has been configured in the NISO mode.

During the start-up or power-on sequence of the IC 11, the mode configuration circuit 18 configures the IC 11 to operate in one of the ISO and non-ISO modes while disabling the other mode. For example, the reset pad RST, clock pad CLK and input/output I/O pad are disabled when the IC 11 is configured in the USB mode, and the D-plus pad D+ and D-minus D− pad are disabled when the IC 11 is configured in the ISO mode. To prevent any glitches, the detected mode is latched by the latching circuit 40. The operating system of the IC 11 will then check this bit during the reset routine to access the appropriate code for the latched mode.

Accordingly, if the smart card 10 including the multi mode IC 11 is used with a typical smart card reader, it will operate as specified in the ISO 7816 protocol while the USB interface, i.e. the D-plus D+and D-minus D− pads, is disabled to consume less power. However, because the IC 11 includes a USB interface, ISO 7816-like transactions can be performed using a low-cost USB device rather than an ISO-compliant smart card reader. Here, the ISO mode interface, i.e. the reset RST, clock CLK and input/output I/O pads, is disabled. Once the IC 11 is configured in one of the modes, it must stay in that mode until another power-on-reset.

Preferably, the mode detector 49 detects whether a signal on the clock pad CLK is less than about 30% of a voltage supply signal on the voltage supply pad VCC, and the mode configuration circuit 18 configures the IC 11 in the ISO mode if the signal on the clock pad CLK is less than about 30% of the voltage supply signal on the voltage supply pad VCC. Alternatively, the mode configuration circuit 18 configures the IC 11 in the USB mode if the signal on the clock pad CLK is not less than about 70% of the voltage supply signal on the voltage supply pad. If so, then the USB voltage detector 30 detects whether a power supply on the voltage supply pad VCC is greater than about 3.5 volts or preferably between about 4.01 and 5.5 volts to verify that the multi-mode IC 11 can communicating with a USB interface.

A system using such an IC 11 in accordance with the present invention includes a ISO-protocol reader and a USB-protocol reader. The ISO-protocol reader may be a conventional smart card reader that would provide the necessary clock signal at the clock pad of the IC. Thus, when a smart card 10 including the multi mode IC 11 is inserted into a conventional smart card reader, the mode configuration circuit 18 configures the IC 11 in the ISO mode because the signal on the clock pad CLK would be less than about 30% of the voltage supply signal on the voltage supply pad VCC. However, a USB-protocol reader in accordance with the present invention includes a USB-mode indication circuit 70 which provides the clock pad CLK with a USB-mode indication signal, such as a fixed voltage level, which will be discussed in detail below. So, when the smart card 10, or other medium, is connected to such a USB-protocol reader, the mode configuration circuit 18 configures the IC 11 in the NISO mode because the signal on the clock pad CLK would not be less than about 70% of the voltage supply signal on the voltage supply pad VCC.

Figure 4:
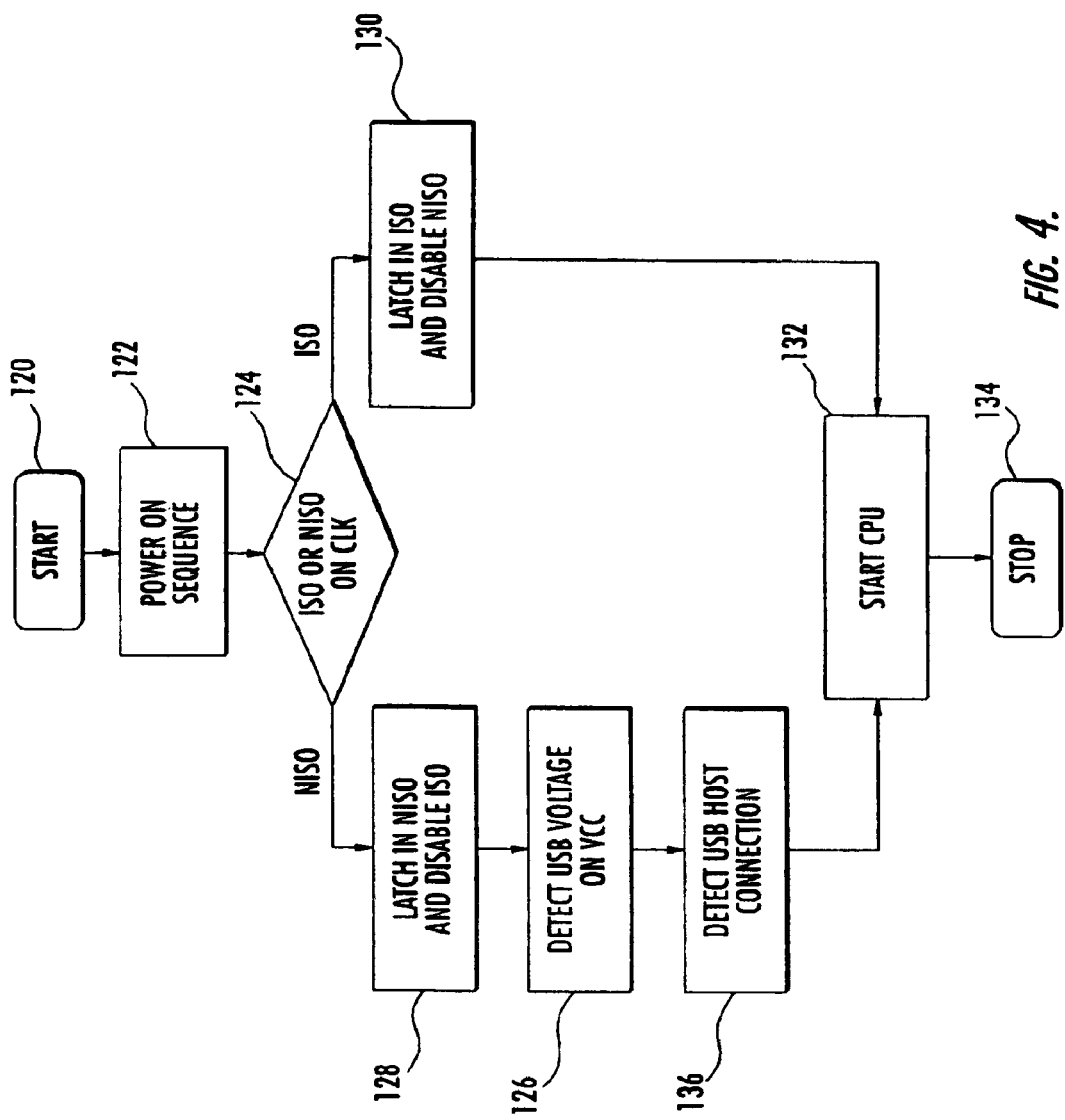
FIG. 4 is a flowchart generally illustrating the steps of a method of operating the multi mode IC of the present invention.
Figure 5:
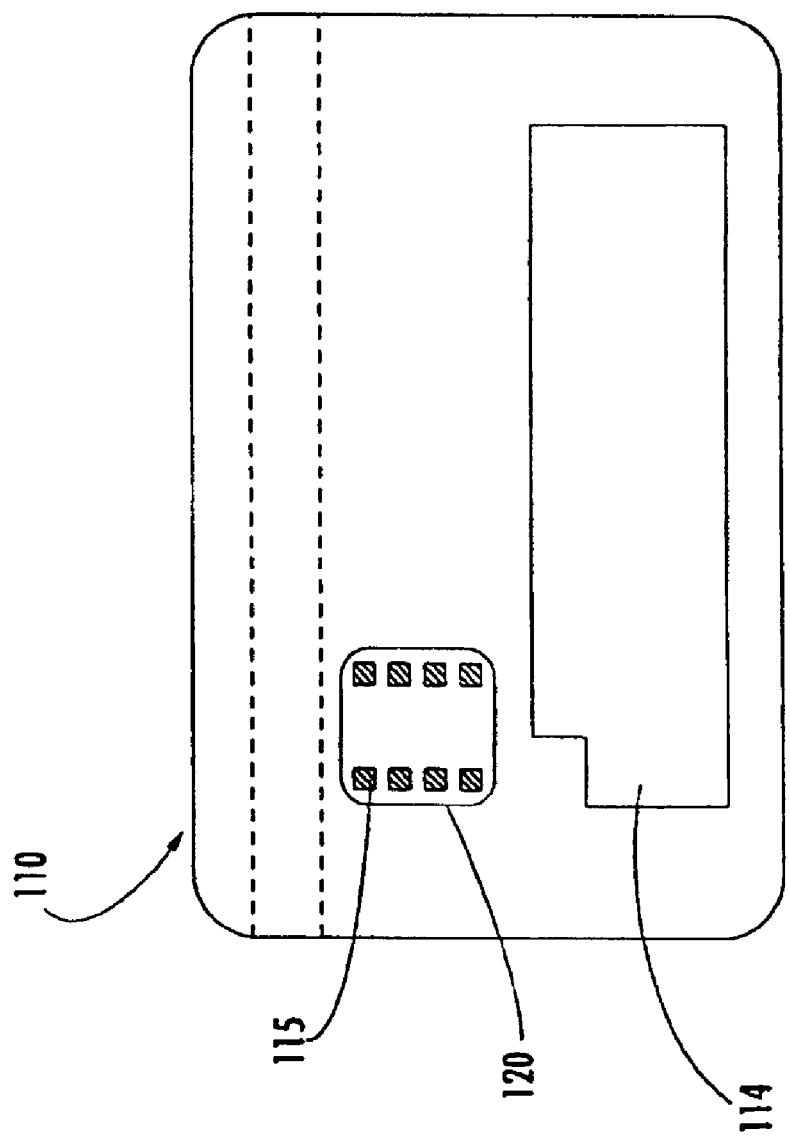
FIG. 5 is a schematic diagram illustrating the SC with the lead frame contacts.
Figure 6:
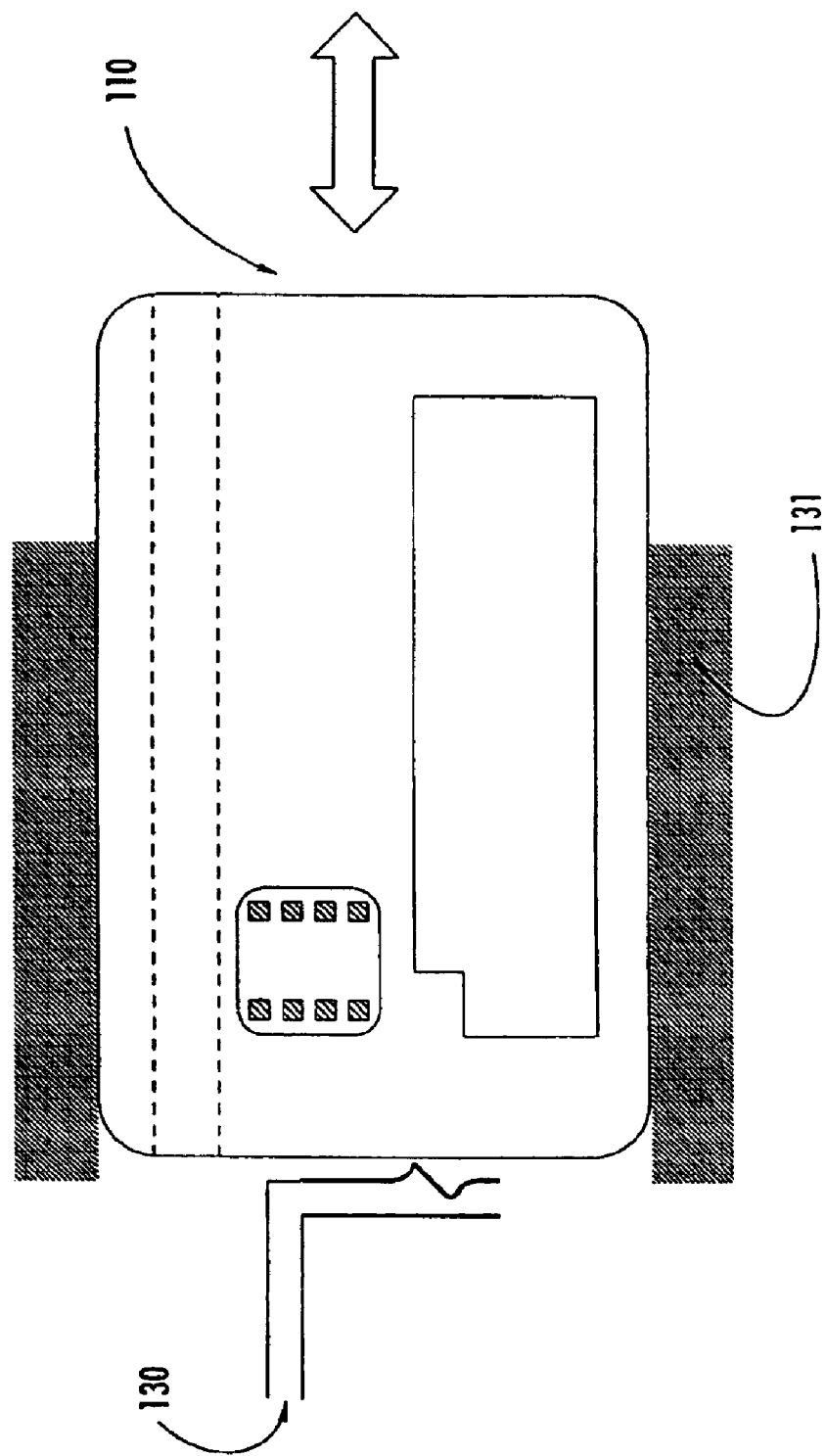
FIG. 6 is a schematic diagram illustrating the electromechanical switch detecting that a SC is inserted in a SC reader.
Figure 7:
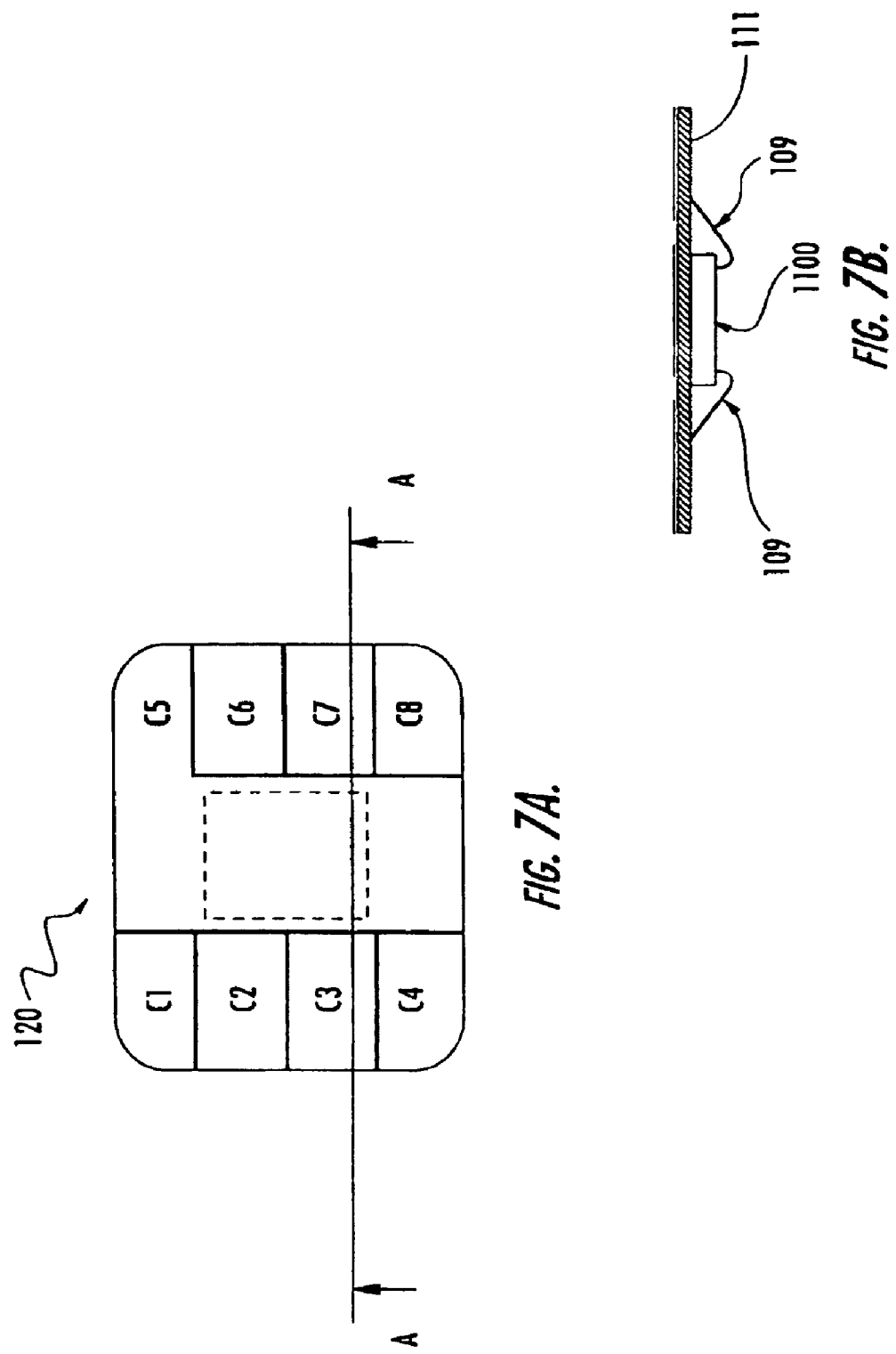
FIGS. 7A and 7B are schematic diagrams illustrating an IC attached to an ISO lead frame and wire bonded to the lead frame contacts.

A method aspect of the present invention will now be discussed while referring to FIG. 4. The method includes operating a multi-protocol smart card 10 in a first mode in accordance with an ISO protocol, and a second mode in accordance with a non-ISO protocol, such as the USB protocol. As discussed above, the multi-protocol smart card 10 includes an external interface 12 having a voltage supply pad VCC, a reference voltage/ground pad GND, a first set of pads Clk, RST, I/O in accordance with the ISO protocol, and a second set of pads, e.g. D+, D-, in accordance with the non-ISO protocol such as USB.

The method begins (block 120) and a power-on-reset sequence of the IC 11 is started at block 122. Then, at block 124, the method includes detecting whether an ISO mode condition exists on one pad of the first set of pads during the power-on-reset of the multi-mode IC, or whether a non-ISO mode condition exists on the one pad of the first set of pads during the power-on-reset of the multi-mode IC. For security and integrity of the IC 11, the mode should be detected as soon as possible. In a preferred embodiment, it is detected whether a signal on the clock pad CLK is less than about 30% of a voltage supply signal on the voltage supply pad VCC. If the signal on the clock pad CLK is less than about 30% of the voltage supply signal on the voltage supply pad VCC, the IC 11 is configured in the ISO mode and the second set of pads, e.g. D+, D-, in accordance with the non-ISO protocol such as USB, is disabled (block 130) by connecting them to GND, for example. Alternatively, if the signal on the clock pad CLK is not less than about 70% of the voltage supply signal on the voltage supply pad VCC, the IC 11 is configured in the non-ISO or USB mode, and the first set of pads, i.e. Clk, RST, I/O, in accordance with the ISO protocol is disabled (block 128) by connecting them to GND, for example.

Again, the method may include verifying the non-ISO mode, when the non-ISO mode condition is detected at block 124, by detecting a non-ISO mode voltage, e.g. a USB mode voltage, on the voltage supply pad VCC (block 126) and detecting a USB host connection (block 136). The method may include storing a mode configuration indicator for indicating whether the multi-mode IC is configured in the ISO or non-ISO mode (block 132) before ending at block 134.

For example, the IC 11 is configured in the ISO mode if an ISO condition is detected on the clock pad CLK. A mode indication signal may be provided on the clock pad CLK if the IC 11 is communicating with a virtual USB reader 22. If so, then the IC 11 is configured in the USB mode. Also, if a USB interface is detected via the clock pad CLK during the power-on reset sequence, then a detection for a USB cable may be performed, and the USB voltage is verified on the voltage supply pad VCC before the IC 11 is configured in the USB mode.

The IC 11 is either configured in the ISO or USB mode depending on the signal level at the clock pad CLK during the power-on reset sequence. To identify the non-ISO mode, such as USB, a fixed voltage level is applied to the clock pad CLK. This may be done at the reader and/or on the IC 11 using a pull-up resistor between VCC and CLK. The ISO 7816 power-on-reset sequence begins by applying the voltage supply to VCC and the reference voltage/ground to GND while the signals on RST and CLK are kept low or at "0". Then the I/O pad receives a signal from a pull-up resistor at the reader or on the IC 11 to put the IC in a receiving mode. Then a clock signal is provided on CLK and after a certain amount of time, the signal on RST is set high or at "1". This starts the IC's reset sequence. The signal is provided on RST when the reader is sure the IC 11 is in the power-on reset state and waiting for the reset sequence.

So, in sum, the clock signal on CLK begins at "0" and then is activated at a minimum time of 400 cycles before the signal on RST rises. Since a fixed voltage level is applied on CLK when the IC 11 is communicating with a USB device, if the signal detected on CLK is fixed at "1" (greater than 70% of VCC), then the IC is configured in the USB mode. If the signal on CLK is a clock signal alternatively greater than 70% of VCC and less than 30% of VCC, then the IC 11 is configured in the ISO mode. This detection at block 124 can be a test of whether the signal on CLK is less than 30% of the signal on VCC. If so, then ISO mode. If not, then USB mode. Then, for USB detection, at block 126, the voltage supply signal on VCC is checked to ensure it is greater than 4.01 Volts. According to the USB protocol, the voltage supply on VCC in the USB mode should be between about 4.01V and 5.5V.

Of course, other ISO pads, such as the reset pad RST, variable supply voltage VPP, and the input/output pad I/O, may also be used with varying degrees of complexity. Once the IC 11 is configured in one mode, it can only operate in that mode and it cannot be changed except via another power-on-reset sequence. To prevent any glitches, the detected mode is preferably latched and a mode indicator/bit is set. The operating system of the IC 11 will then check this bit during the microcontroller reset routine to access the appropriate code for the latched mode.

Thus, a multi-mode IC 11, smart card 10, system and associated method of operation in the ISO 7816 protocol and another non-ISO protocol, such as the USB protocol, have been described in accordance with the present invention. A medium, such as the smart card 10, incorporating the multi-mode IC 11 can be used in a typical ISO compliant smart card reader or in a lower-cost virtual USB reader, such as a personal computer.

More specifically, the present invention will be described with reference to FIGS. 5-28. The present invention establishes a bridge between the brick and mortar field and the Internet. This is the Universal Serial Bus and ISO Smart Card (USIC) 110. The USIC 110 is able to perform either transactions on an ISO SC reader 120 (FIG. 11) or transactions directly on a USB port 124 (FIG. 18). In the latter case the USIC 110 is really a USB device supporting amongst other USB characteristics the suspend state. The very same USIC 110 may be used in a POS or in an ATM and also in surfing the web because the ISO SC reader burden has disappeared. For example, one person carrying a USIC 110 can use it to shop on his favorite Internet sites through the USB protocol and use it to get cash from the ATM with the ISO protocol. The same portable device services two needs. To furthermore embrace possible applications dedicated to the PC environment a SC with only a USB interface 120' (FIG. 26) is also available (USC).

The USB SC reader interface is partly included in the USC or the USIC and partly included in the PC. The IC 1100 used in a USIC 110 can handle either the USB protocol or the ISO protocol while performing the same application. Both USC and USIC interface with the USB with a simple passthrough connector. Beside the passthrough connector and few decoupling capacitors, USC and USIC does not required any other electronic circuits to be seen as a bus powered device 143 on the USB by the USB host controller 121. When a USIC reader 140 is connected to a USB port without the USIC being inserted, the application does not see the reader. This is a virtual USIC reader 140. The USIC reader connected on the USB accepts also USC.

The passthrough connector establishes electrical links between the USB signals on the USB port 124 and the USC or USIC contacts in the virtual reader 140. When there is no card in this virtual reader 140 the system does not see any SC reader. When the USC or the USIC is inserted into the virtual reader 140, the system sees the virtual reader once the USB device has been enumerated.

This invention relates to methods and devices enabling USB transactions when a USIC or a USC is used in a virtual USB SC reader and at the same time these methods and devices enable ISO transactions when a USIC is used in an ISO SC reader. The field of the invention is that of authentication devices and more specifically SC, Token and IC carrying more than one serial interface such as USB and ISO and authentication devices and more specifically SC, token and IC carrying USB interface only.

An ISO reader 120 (FIG. 9) is recognized by the hardware platform using it even when no SC is inserted. The SC needs to be inserted in order for the protocol to start. No electrical signals are applied to the SC until the SC turns on a position switch, which tells the platform that a SC is mechanically in place. A reader used in Payphone, POS or in ATM must comply with all the protocols used by different SC generations to insure legacy. Different SCs can be used in a reader. Both synchronous and asynchronous SCs have obliged reader manufacturer to design interface transceiver on each ISO contacts except the power supply contacts (FIG. 8). The ISO 7816-2 requires up to eight connections between the SC reader and the ISO SC lead frame. Contact C1 is assigned to the Supply voltage VCC, contact C2 is assigned to the Reset signal RST, contact C3 is assigned to the Clock signal CLK, contact C5 is assigned to the GND reference voltage, contact C6 is assigned to the Variable supply voltage VPP and contact C7 is assigned to Data input/output I/O. In synchronous ISO7816-10 applications, under type 2 operating conditions, contact C4 is assigned to function code FCB and contact CB may also be used for other synchronous applications. An asynchronous SC under class B operating conditions does not require VPP voltage on C6. An asynchronous SC under class A operating conditions does require VPP voltage on C6. A synchronous SC under specific operating conditions may assign CB to a fuse zapping capability. Furthermore, each reader contacts, beside VCC and GND, may have passive networks equipped with anti Electro-Static Discharge (ESD) circuits to VCC and GND to protect the IC against ESD during the SC insertion phase. Then, all eight ISO 7816-2 interface contacts have been assigned specific characteristics with active or passive networks.

Once the SC is in place, a switch informs the reader interface that the SC is in place. The powering up sequence may start. As described in the ICO7816-3, the SC reader interface circuit applies VCC and then, at the SC reader earliest convenience, the interface circuit applies the Clock (CLK) signal and after no less than 400 CLK cycles the Reset (RST) signal is released. The SC answers to the reader RST signal by sending an Answer To Reset (ATR) after 400 CLK cycles and before 40000 CLK cycles to the reader. The link is established and any transactions may start.

The SC of the present invention is compatible for use in USB applications. The USB requires four wires. For a USIC or USC, VBUS and GND can be dispatched respectively to the lead frame contacts C1 and C5. This is a minor change since in ISO7816-2, C1 is dedicated to VCC and C5 is dedicated to GND. The signals D+ and D− can also be dispatched respectively to the lead frame contacts C4 and C8. These two contacts were reserved for future use in asynchronous SC as per ISO7816-2. Lead frame contacts C3, C6 and C7 are available for USB mode selection or other uses.

The SC reader compatible with USIC or USC is not recognized by the hardware platform when no USIC nor USC is inserted. The USB SC reader is a virtual USB reader. The reader is recognized by the hardware platform when a USIC or a USC is attached to the USB and behaves like a USB device. When USIC or a USC is inserted in a virtual USB reader 140 it has to select NISO mode until the power is removed.

When the USIC or a USC is inserted in the virtual USB reader 140 there is no switch to detect that the lead frame contacts are well positioned under the reader contacts before the interface applies any signals. The insertion process may take a long time with rebounds of milliseconds. When the SC is inserted into the cost-effective virtual USB reader 140, the lead frame contacts are hot plugged. The power is applied during the process of SC insertion. The SC should detect that it is used in USB and attaches itself to the USB once the insertion process is completed until the next power off sequence. The USB virtual reader 140 mating a USIC or a USC behaves as a USB bus powered device 143. The host 121 will detect that a USB device has been attached and it will reset it before starting its enumeration by sending a single ended zero (SE0) signal. When inserted in a USB virtual reader 140, a SC will not be damaged but will not work.

When inserted in a USB virtual reader 140, a USIC needs to select its NISO mode until a power off sequence comes, and support USR transactions including suspend mode. When inserted in a USB virtual reader 140, a USC will support USB transactions including suspend mode.

To summarize, SC, USIC and USC devices have to comply with the following rules:
1. A USIC has to select the ISO mode of operation when inserted in an ISO reader.
2. A USIC has to select the NISO mode of operation when inserted in an USB virtual reader.
3. A USC is by default in NISO mode and will support USB transactions when inserted in a USB virtual reader.
4. A USC is not damaged when inserted in an ISO reader.
5. A SC is not damaged when inserted in an USB virtual reader.

The mode selection process uses at least one contact. C2 is used at two logic levels in ISO, C3 is driven at zero or by a clock in ISO, C4 may be connected to zero by the interface in ISO and is not available in USB, C6 should be forced to zero by the USB interface, since it may be forced at V?P by the ISO interface, C7 should be forced to zero by the USB interface, since it may be pulled up by the ISO interface and C8 may be connected to zero by the ISO interface and is not available in USB. C3, C6 and C7 may be used to select the mode in which a USIC is going to perform.

Because of the nature of the smart card, inserted and removed once the transaction is complete many times a day for example, there is a need for USIC or USC to detect if it is properly inserted before starting the CPU when used in an USB virtual reader 140. Not only the proper voltage must be applied to the IC 1100 but the link between the device C4 and C8 and the host D+ and D− established. Once the device is physically connected to the host 121, it may attach itself to the USB.

The present invention is implemented to solve the foregoing tasks. It includes a method or a device, which sets the USIC, and more generally the IC used in a USIC device in the mode matching the reader characteristics in which it is inserted. When an USIC is inserted in an ISO reader the USIC is working in ISO and the RST signal supplied by the SC reader interface starts the microcontroller. When an USIC is inserted in a USB virtual reader 140, the USIC is working in a non-ISO (NISO) and the reset signal for the microcontroller is generated using D− or D+signals in conjunction with a Low Voltage Detection. When an USC is inserted in a USB virtual reader 140, the USC is working in NISO and the reset signal for the microcontroller is generated using D− or D+signals in conjunction with a USB voltage detector.

The control logic of the IC 1100 used in USIC performs the following tasks in a first preferred embodiment:

- detects if an appropriate first power supply voltage is applied to the IC;
- detects if any CLK is applied to the C3 pin of the IC while it is pulled up by a load to C1, if the CLK is applied or stays at zero, the mode is ISO else the mode is NISO;
- stores the result in a MODE register;
- if the IC is latched in the ISO mode, the pin RST starts the microcontroller, which check the MODE register content and all transactions are performed as specified in ISO-7816 standards;
- if the IC is latched in the NISO mode, the voltage present on C1 is checked to be greater than a second minimum power supply voltage specified by the USB specification greater than the first voltage and if it is so, the control logic detects if the pins D− or D+ are pulled down by the USB host 15 kΩ pull down resistors after a defined settling delay, else nothing happens until the voltage becomes greater than the acceptable limit;
- if the pins D− or D+ are pulled down by the USB host 15 kΩ pull down resistors this information is stored in a USB_RST register and the control logic of the IC authorizes the microcontroller to start, The microcontroller reads MODE register content and the program enters the USB subprogram;
- the subprogram waits an appropriate time such that the attachment of the device may be effective before 100 ms after the good supply voltage has been detected, as described in the USB specification, the microcontroller checks if the pins D− or D+ are pulled down by the USB 15 kΩ loads by reading the actual status of the connections. If the connections are established the device attach itself to the USB by connecting a pull up resistor on D− for a low speed device and D+for a full speed device on one side and to an internal 3.3 Volt voltage reference on the other side in compliance with the USB specifications and all transactions are performed as specified in USB specifications. If this is not the case the microcontroller goes in MUTE and waits for a new power up sequence.

When a USIC or a USC is inserted into an USB virtual reader 140, the Smart Card interface must be able to detect that it is used in USB and start an adapted power up sequence compliant with the USB specification. When a USIC is inserted into an ISO reader 120, the Smart Card interface must be able to detect that it is used in ISO and start an adapted power up sequence compliant with the ISO specification.

When a SC 110 (FIG. 5) equipped with a module 120 having contacts 115, and possibly a magnetic strip 112 and an embossed area 114, is inserted in a SC reader (FIG. 6) guided by 131 a switch 130 stops the SC and signals that a SC is inserted. The SC 110 is carrying a module 120 (FIGS. 7A and 7B) where all eight ISO contacts C1–C8 are at the opposite of a lead frame 111. An IC 1100 is attached to the lead frame 111. Electrical connections between the IC 1100 and the lead frame contacts are done using wire bonding techniques 109. A mechanical and chemical protection will complete the packaging of this less than 200 $\mu$m-thickness structure.

Turning now to FIG. 8, there is a table listing which contacts synchronous and Asynchronous applications are using. I1 application are still in use for prepaid SC. On the same table we have listed the present applications USIC and USC and how are assigned the contacts described in ISO7816-2 to the module embedded in these cards.

Turning now to FIG. 9, it represents the prior art where the ISO SC reader 120 handles ISO SC only. A computer 121 has three main interfaces: parallel 122, series 123 and USB 124. The ISO SC reader 120 is having a Computer to ISO $2^{nd}$ interface 125, a ISO driver $1^{st}$ interface 126 and a passthrough connector 127.

Figure 10:
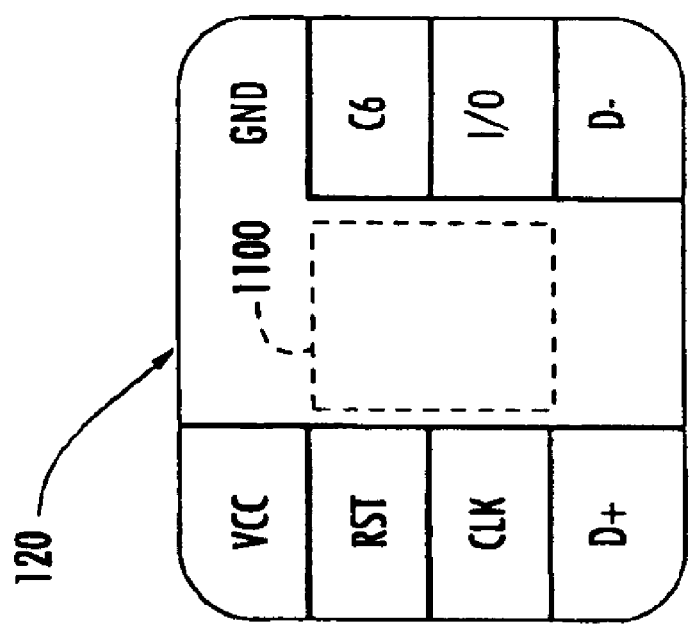
FIG. 10 is a schematic diagram illustrating a USIC module.

Turning now to FIG. 10, module contacts have been given names compliant with ISO and USB applications.

Figure 11:
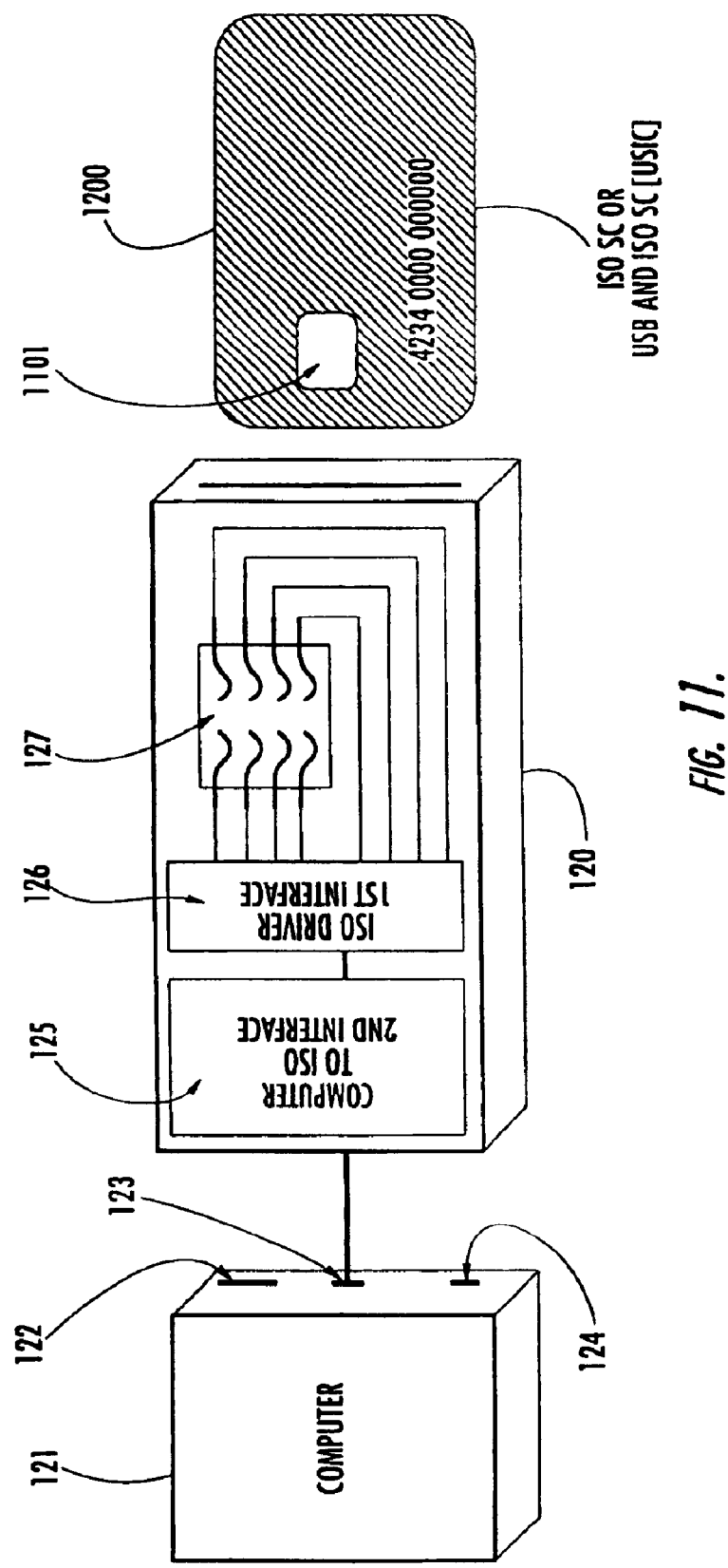
FIG. 11 is a schematic diagram illustrating a USIC or an ISO SC compatible with the ISO SC reader.

Turning now to FIG. 11, there is shown an ISO SC reader 120 handling ISO SC, or USB compliant SC such as USIC or USC.

Figure 12:
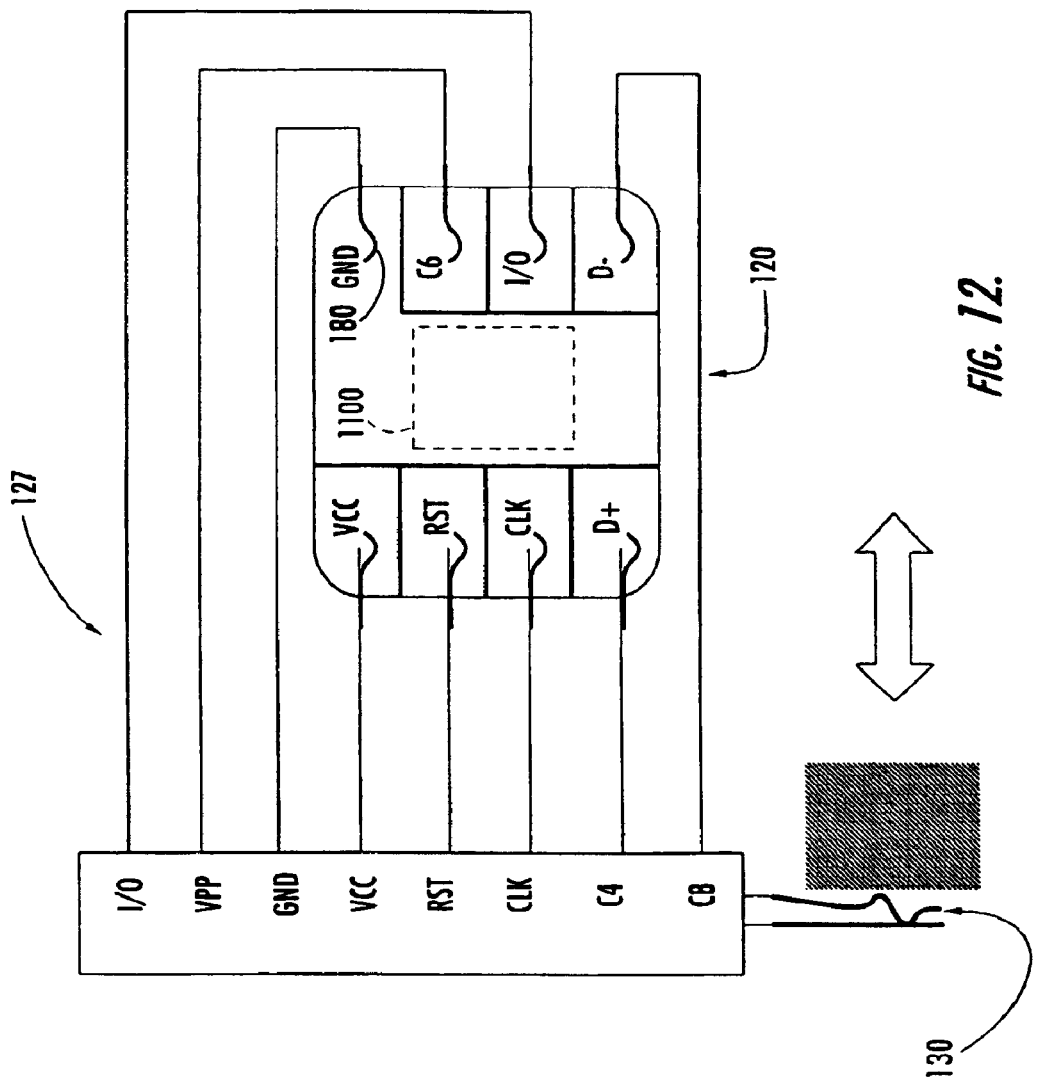
FIG. 12 is a schematic diagram illustrating the ISO signals with the position switch activated by the SC insertion.

FIG. 12 represents the action of the SC insertion in the SC reader 120 on the switch 130.

Figure 13:
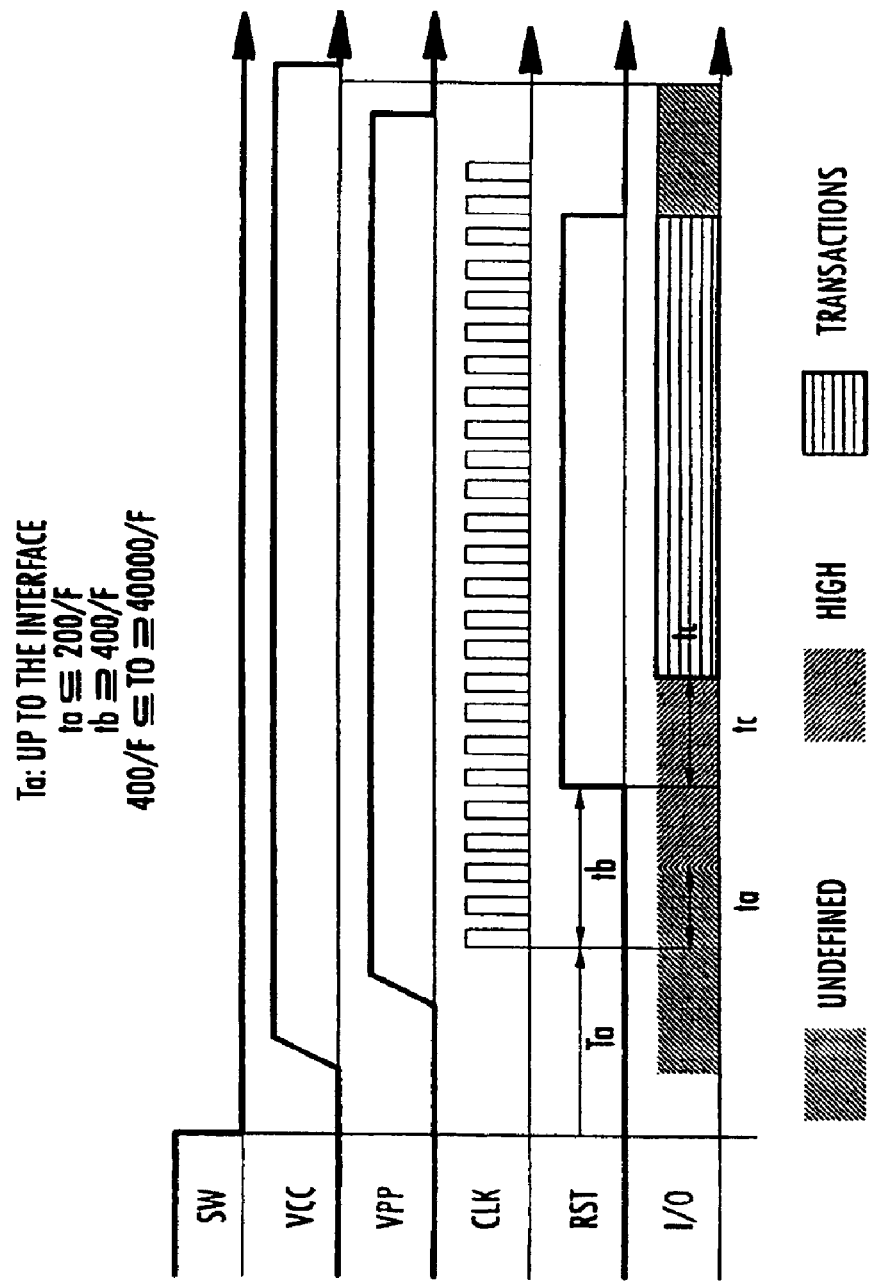
FIG. 13 is a timing diagram showing the ISO signals referenced to the position switch activated.

Passthrough contacts 180 mate with module contacts. Turning now to FIG. 13, it represents the signals generated by the ISO SC interface once the switch 130 has been detected on. VCC is applied first than VPP if any, and up to the interface the clock may appear followed by a RST. It is important to note that in ISO, the contact C3 (RST) is at "0" or shortly at "1" and never permanently at "1".

Figure 14:
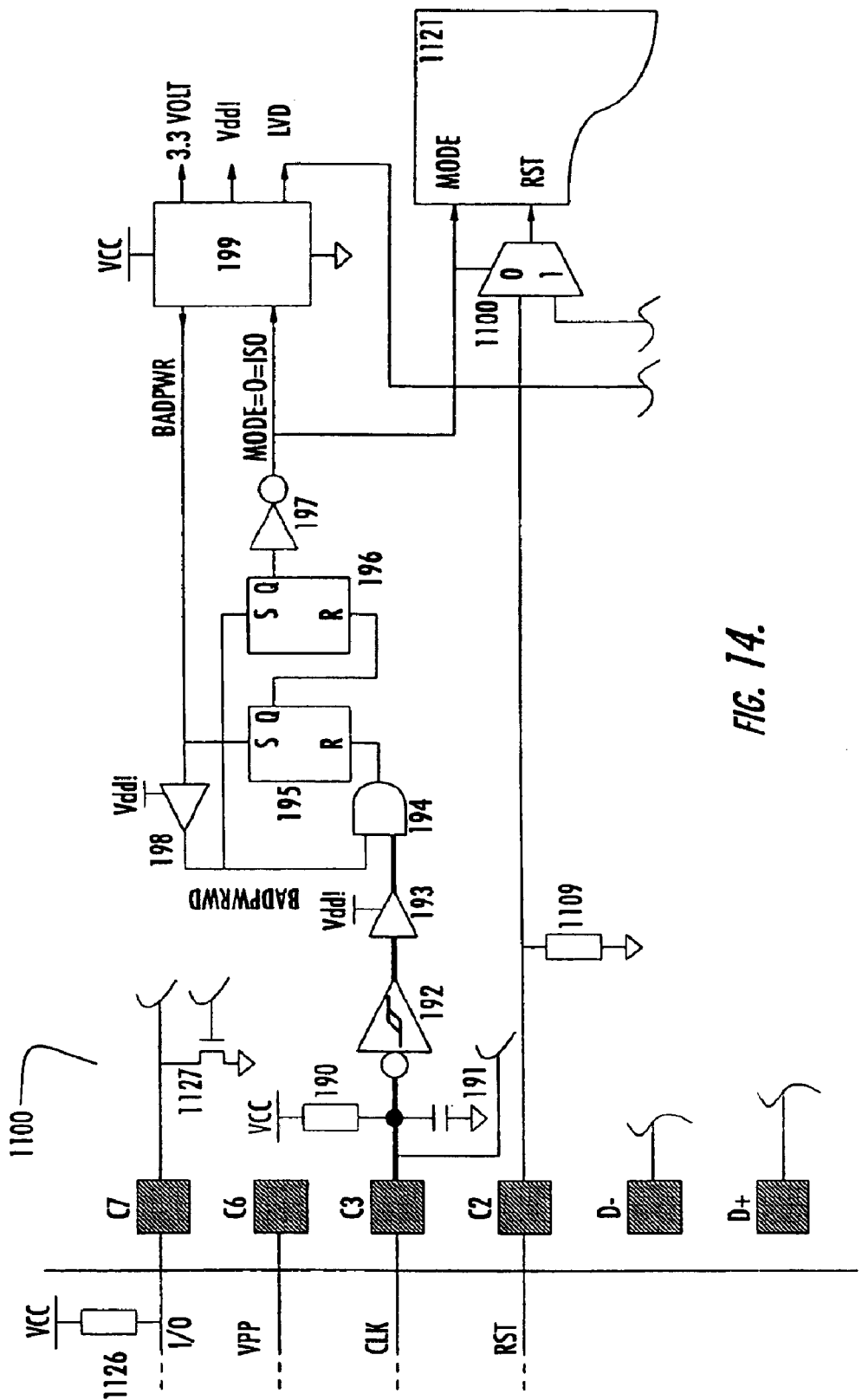
FIG. 14 is a schematic diagram illustrating a USIC inserted in an ISO SC reader selecting the mode using CLK signal.

FIG. 14 represents a preferred embodiment of the invention where the IC 1100 has a pull up resistor 190 on C3 inside the IC 1100. 192 is an inverting Schmitt trigger. The USIC is in an ISO SC reader.

Figure 15:
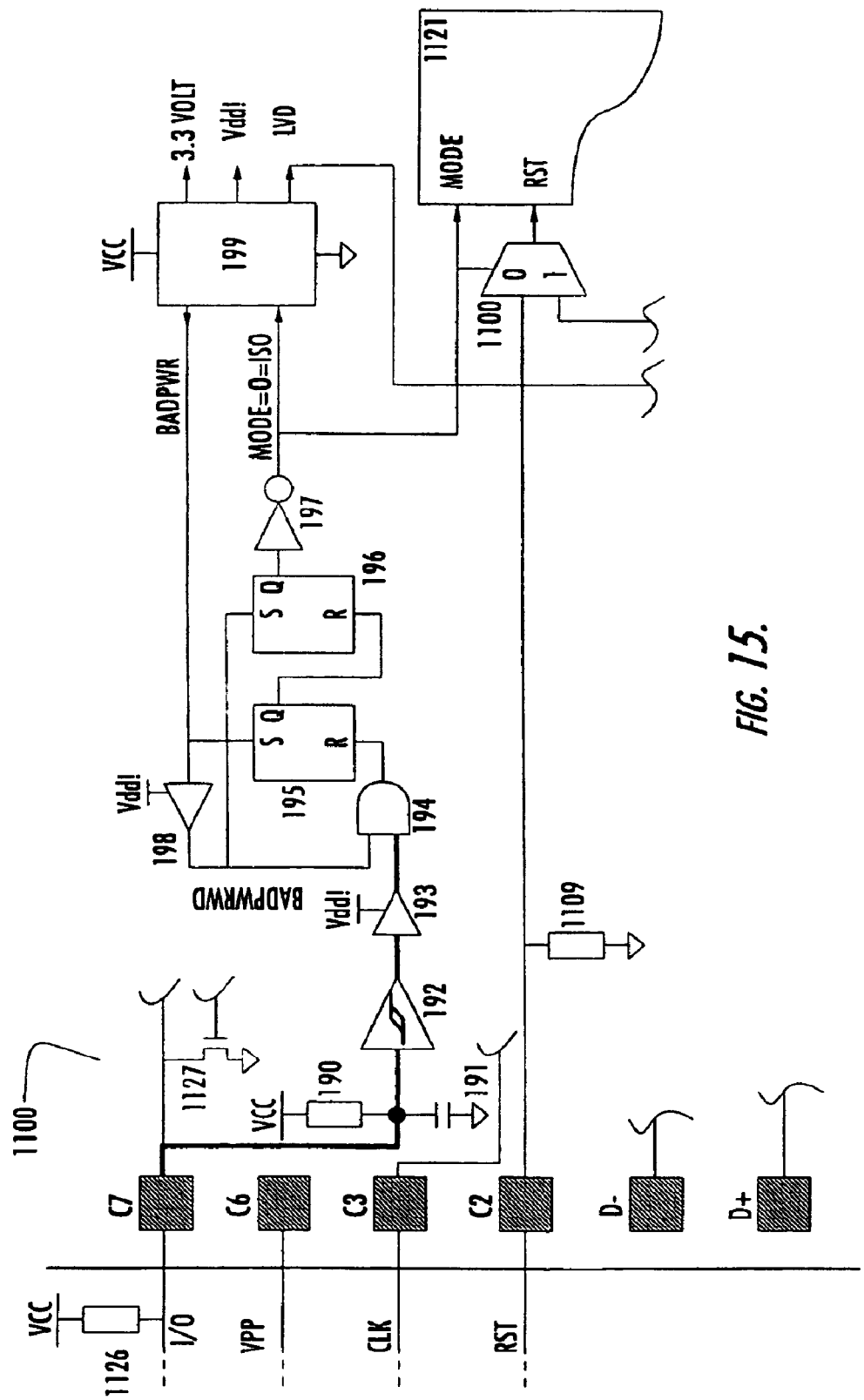
FIG. 15 is a schematic diagram illustrating a USIC inserted in an ISO SC reader selecting the mode using I/O signal.

FIG. 15 represents another embodiment of the invention where the IC 1100 has a pull up resistor 190 on C7 inside the IC 1100. 192 is a non inverting Schmitt trigger. The USIC is in an ISO SC reader.

Figure 16:
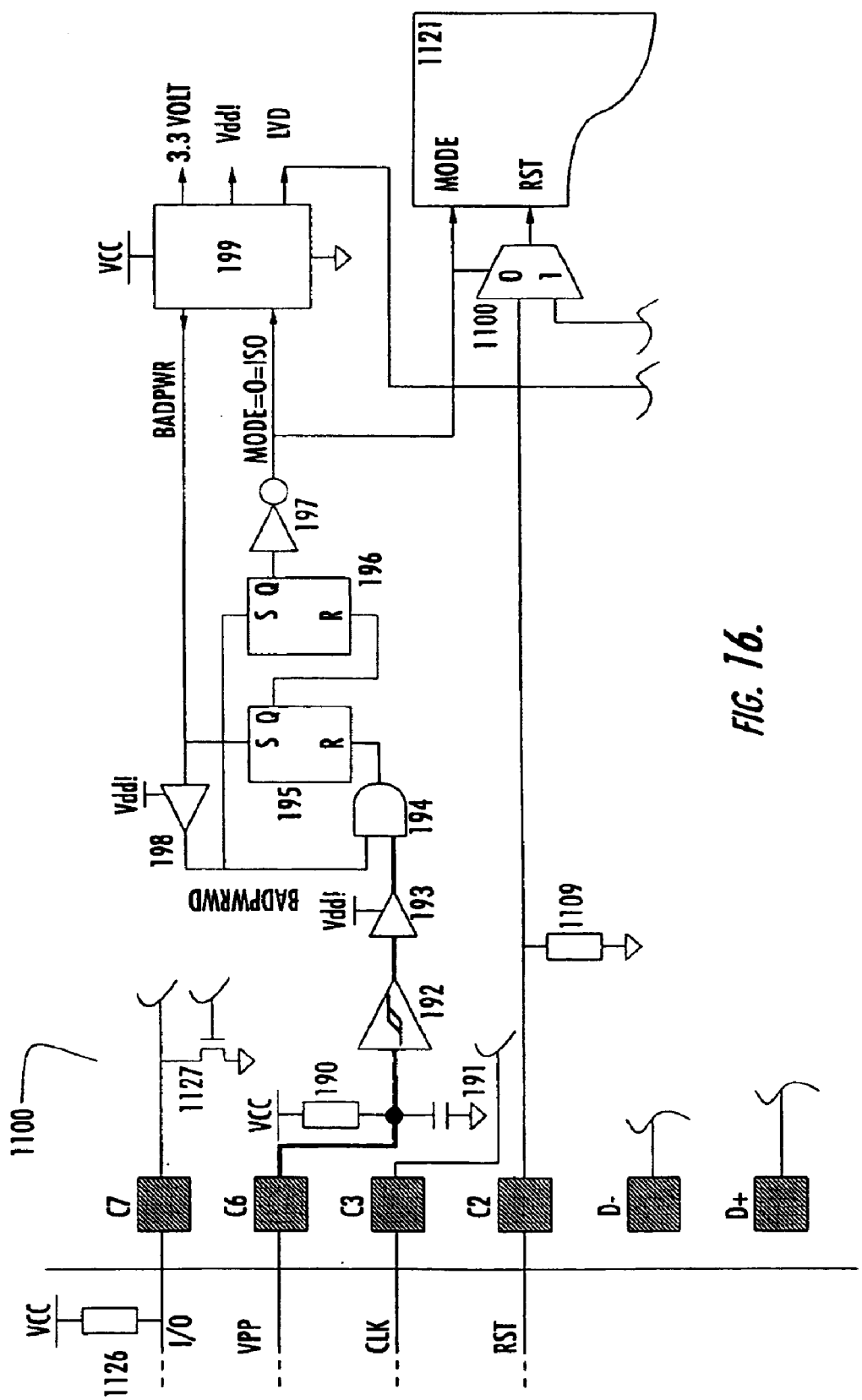
FIG. 16 is a schematic diagram illustrating a USIC inserted in an ISO SC reader selecting the mode using VPP signal.

FIG. 16 represents another embodiment of the invention where the IC 1100 has a pull up resistor 190 on C6 inside the IC 1100. 192 is a non inverting Schmitt trigger. The USIC is in an ISO SC reader.

Figure 17:
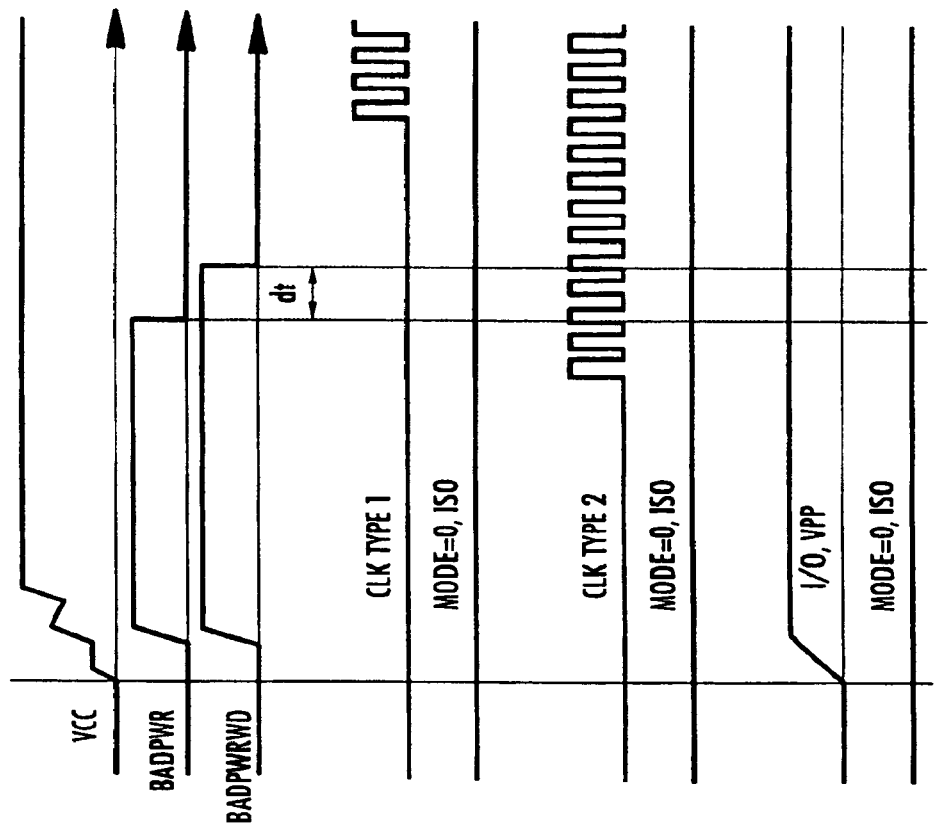
FIG. 17 is a timing diagram showing the MODE signals after power up when USIC is used in an ISO SC reader.
Figure 18:
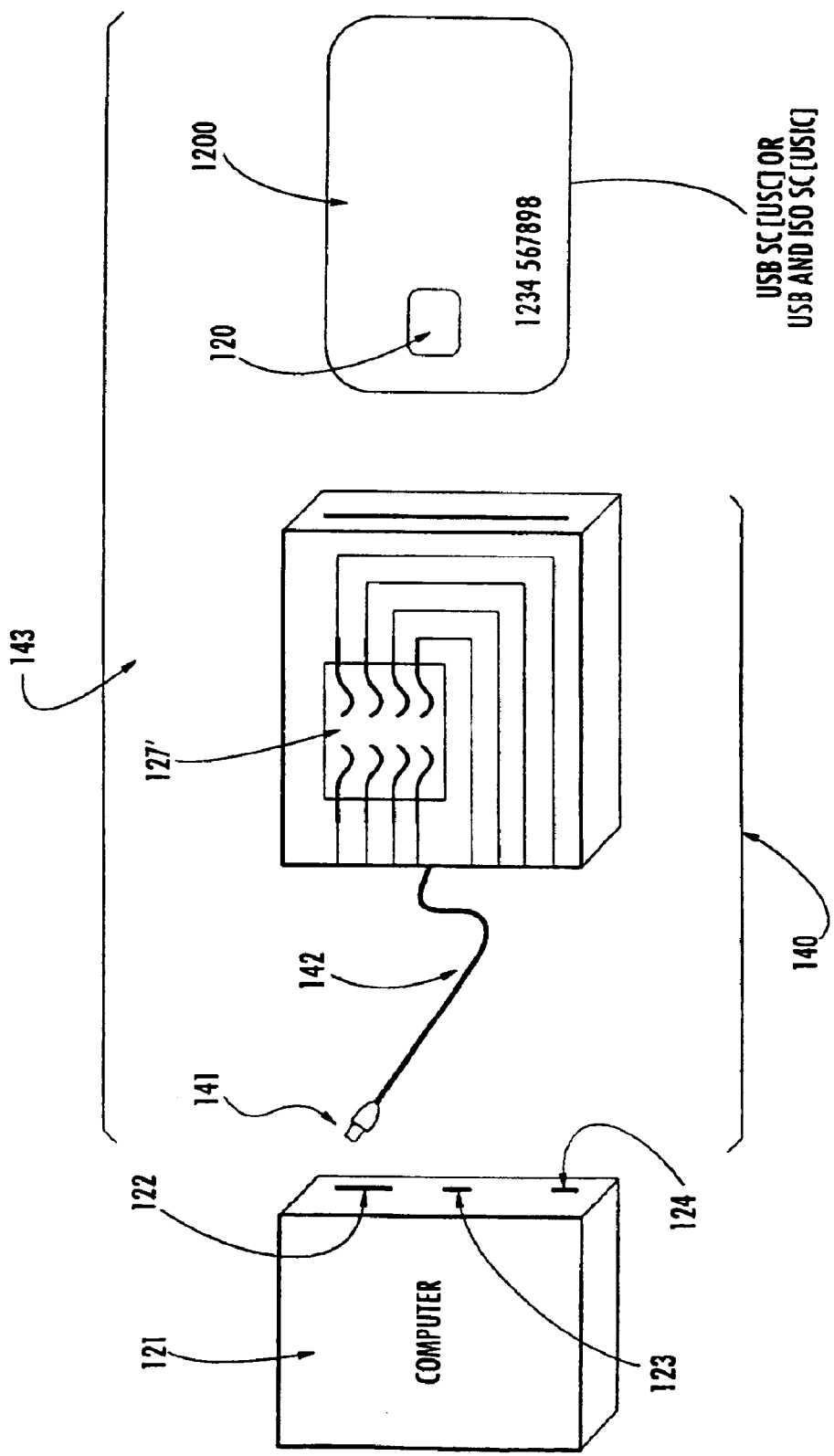
FIG. 18 is a schematic diagram illustrating the USB virtual reader and the USIC or USC.

FIG. 17 summarizes what is happening in the three above embodiments. Embodiment of FIG. 14, when VCC is set on C1 a signal Badpwr is set to "1" until the voltage VCC is above a certain limit, example 0.8 Volt, for at least a certain period of time, example 500 $\mu$s. Badpwrwd is the same signal which ast approximately 4 $\mu$s (dt) more. The CLK type 1 signal is applied, and if during dt the signal at the input of 192 goes to "0" the latch 195 is reset and MODE is forced to "0" by the set on 196. If the CLK type 2 signal is applied, during dt the signal at the input of 192 goes to "0" the latch 195 is reset and MODE is forced to "0" by the set on 196. For both clock signals, dt must be greater than the half period of the largest period, 1 $\mu$s, allowed on C3.

The embodiment of FIG. 15, when VCC is set on C1 a signal Badpwr is set to "1" until the voltage VCC is above a certain limit, example 2.8 Volt, for at least a certain period of time, example 500 $\mu$s. Badpwrwd is the same signal which last approximately 4 $\mu$s more. The C7 contact is having a weak pull up resistor outside because of the ISO protocol but also inside to be sure that there is a pull up. If during dt, the signal at the input of 192 stays at "1" the latch 195 is reset and MODE is forced to "0" by the set on 196. The embodiment of FIG. 16, when VCC is set on C1 a signal Badpwr is set to "1" until the voltage VCC is above a certain limit, example 2.8 Volt, for at least a certain period of time, example 500 vs. Badpwrwd is the same signal which last approximately 4 µs more. The C6 contact is having a voltage VPP driving it because of the ISO protocol but is having also a pull resistor 190, if during dt the signal at the input of 192 stays at "1" the latch 195 is reset and MODE is forced to "0" by the set on 196.

Figure 19:
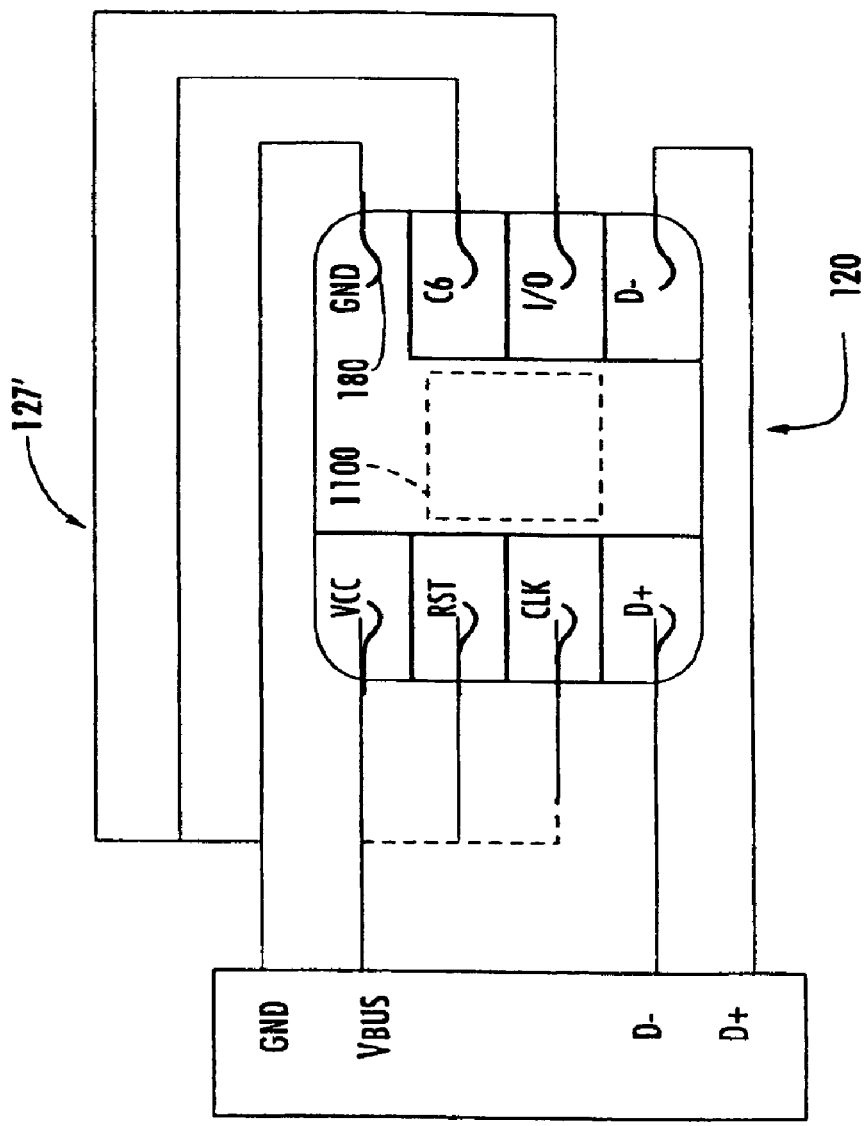
FIG. 19 is a schematic diagram illustrating the USIC used with an USB virtual reader.

Turning now to FIG. 18, it represents a virtual USB reader 140 with its passthrough connector 127', its USB cable 142 and the USB series A plug connector 141. USC and USIC are compliant with this reader. The virtual reader 140 is connected to the USB port 124 of the host PC 121. The SC 1200 inserted in the virtual reader 140 forms a USB device 143. Turning now to FIG. 19, passthrough contacts 180 mate with module contacts. There is no action of the SC telling the SC reader to apply voltages. The embarqued system on the chip 1100 not only must select the mode NISO but it must be sure also to start the microcontroller in an appropriate manner since there is no reset signal. The pin C6 and I/O are connected to GND since that is the only possibility for them if they are used to detect the mode NISO, and the pin C3 may be connected to VBUS. The internal pull-up resistor is preferable since it avoids any rebounce between the contact and the pin.

Figure 20:
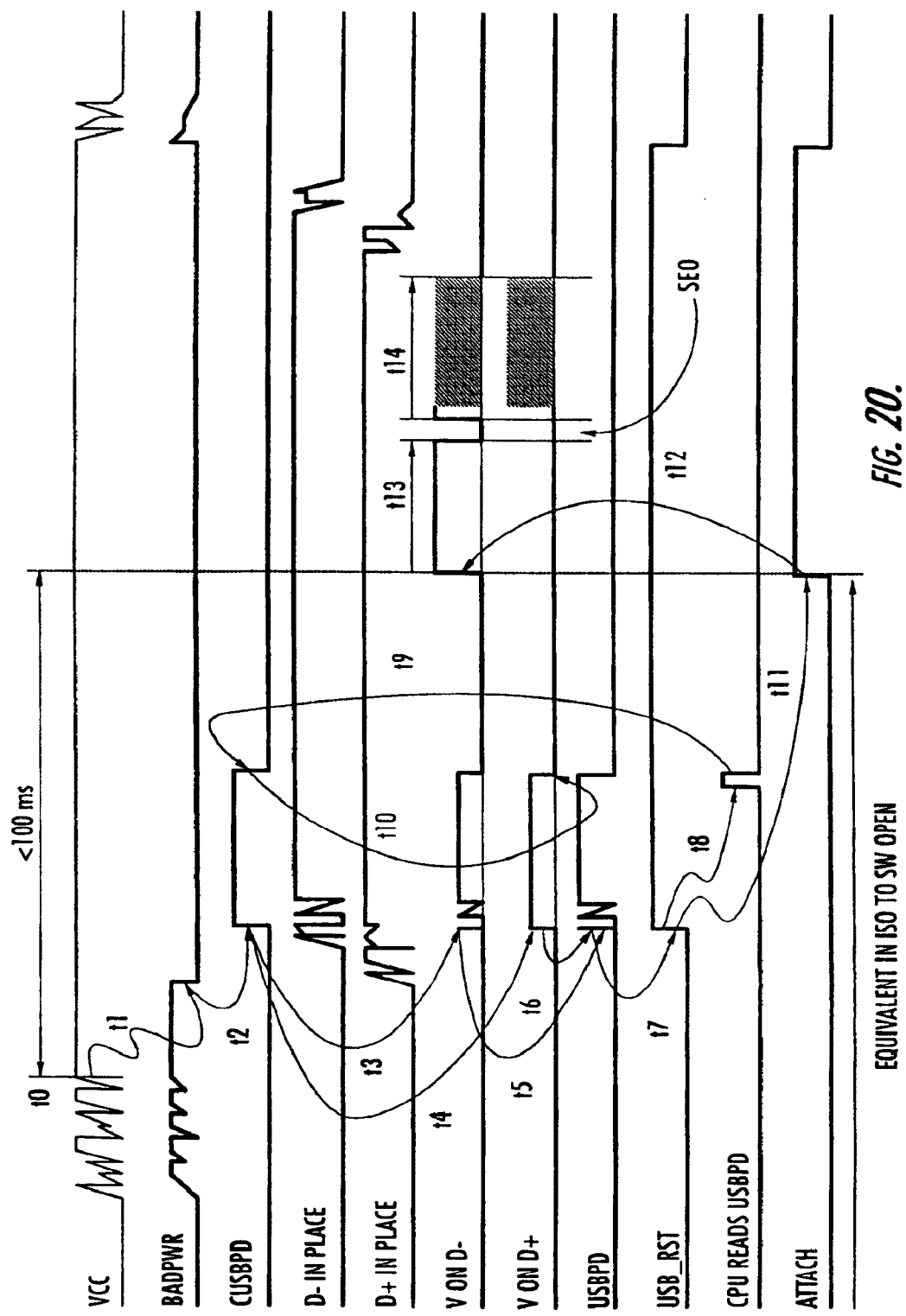
FIG. 20 is a timing diagram showing the signals involved during the power up sequence when USIC is inserted in an USB virtual reader.
Figure 21:
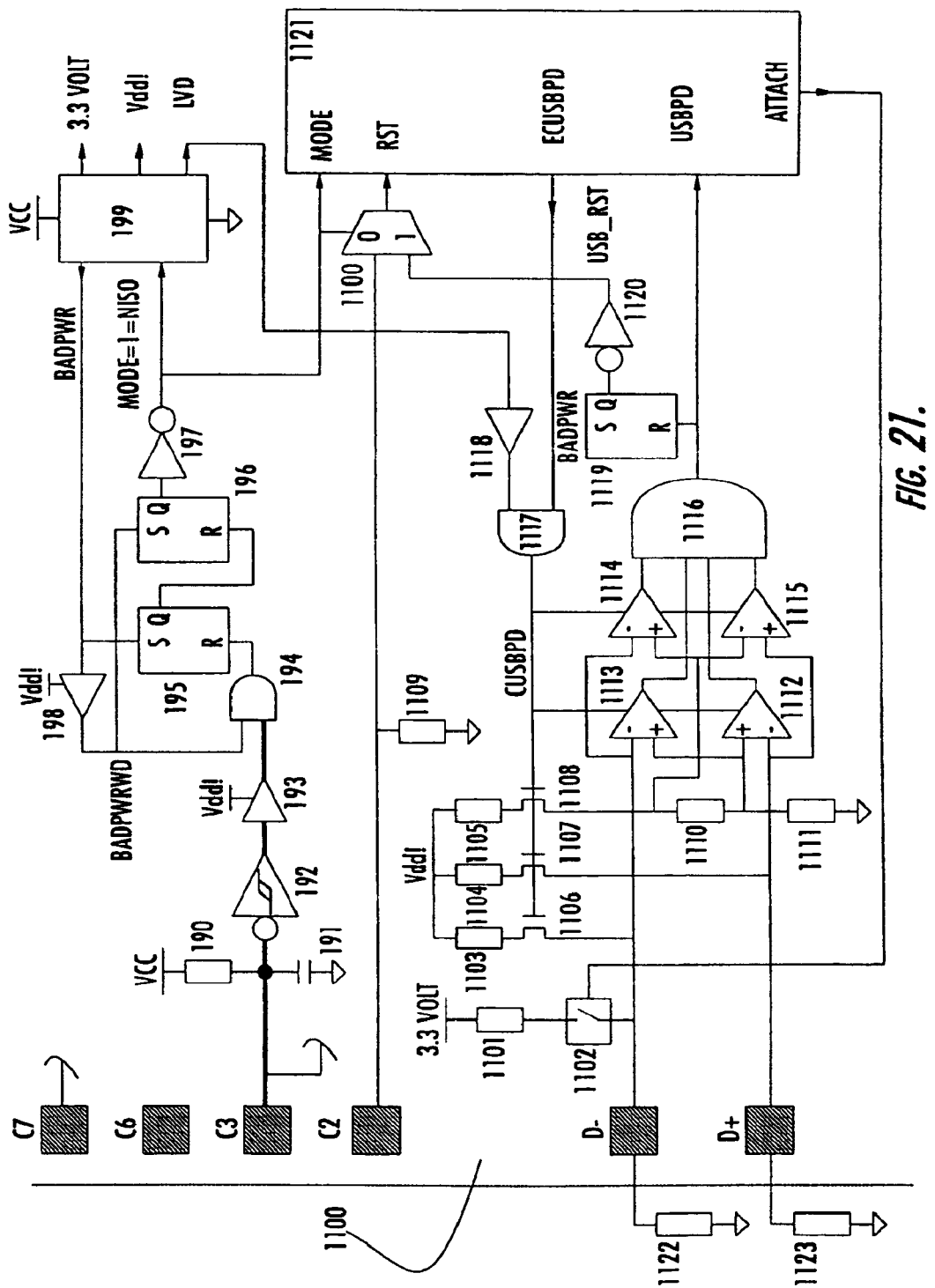
FIG. 21 is a schematic diagram illustrating the USIC inserted in an USB virtual reader selecting the mode using C3 signal.

Turning now to FIG. 20, is represented all the signals involved in a NISO detection. VCC is applied to the USIC or USC at t0. Badpwr will set CUSBPD at t2. By the time being the card insertion process is ongoing and at some point the contact C4 and CB will be connected to the pull down resistors 1122 and 1123 in the host. Signals "D– in place" and "D+ in place" represent the fact that the SC contacts are touching the interface contacts while bouncing. The CUSBPD FIG. 21 signal delivers a current to the resistors 1122 and 1123 calibrated by 1103 and 1104.

The resulting voltages on D– and on D+ are monitored by comparators 1112, 1113, 1114 and 1115. The voltage divider is such that when both the voltage on D– and on D+ are below the voltage on the upper side of the resistor 1110 and above the voltage on the lower side of that same resistor the AND 1116 delivers USBPD t5 and resets 1119 to generate USB_RST at t7. The generated voltages across resistors 1122 and 1123 are less than a VIH of 2.8 Volts such that it is not interpreted by the host as an attachment which occurs at t12. The RST of the CPU 1121 is released because the switching block is as per MODE=1. The CPU has started and initializes itself, reads MODE and performs transactions in USB until there is a power off sequence. Later, but before the 100 ms limit set by the USB specification, the CPU check if the USBPD at t8 is at "1". If so the device disables CUSBPD. The device attaches itself on the USB by ATTACH at t12 by connecting the pull up device 1101 to the 3.3 Volt using 1102. The host drives the USB with the single ended zero (SE0) signal after t13. During t14 the enumeration of the device starts.

Figure 22:
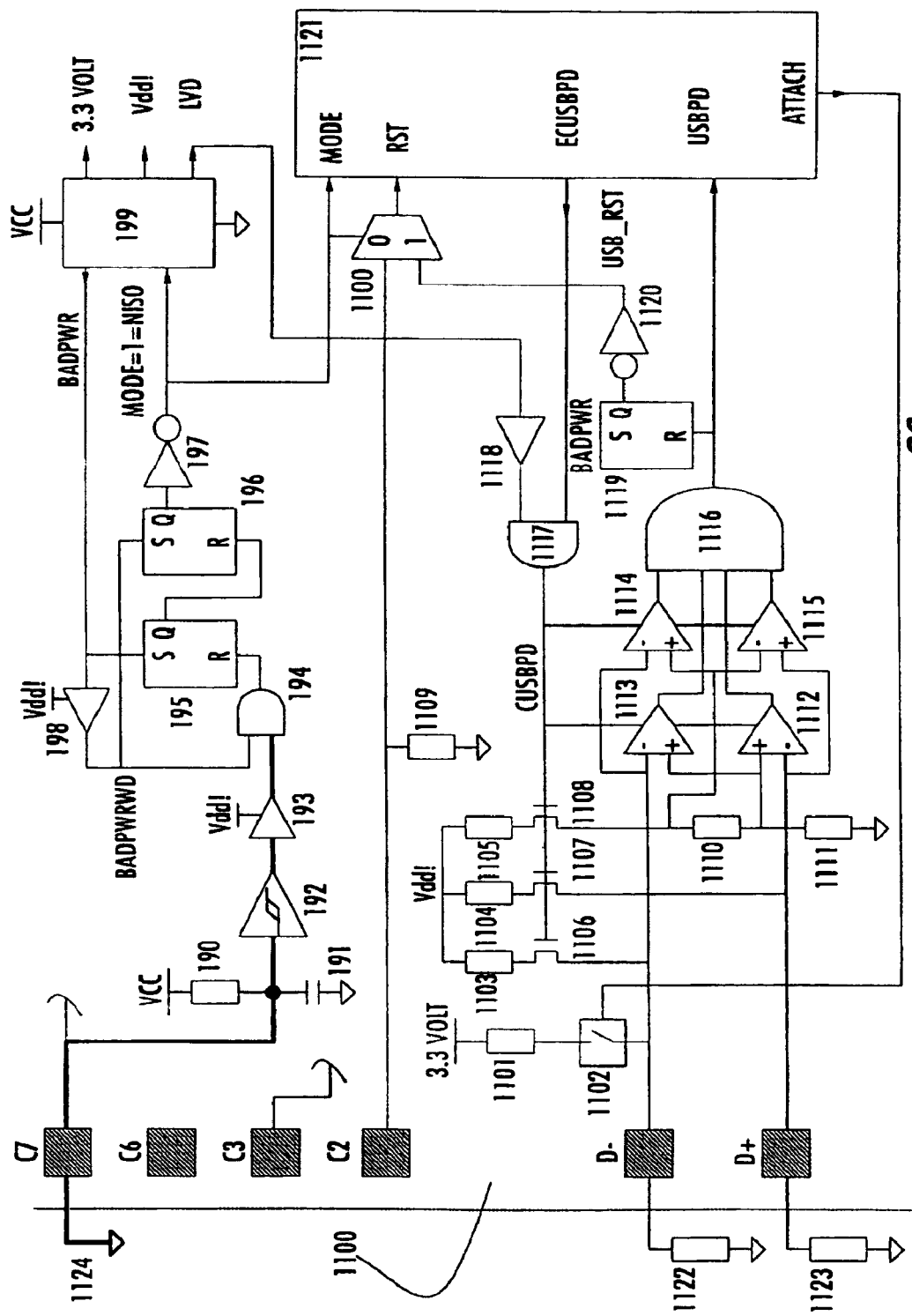
FIG. 22 is a schematic diagram illustrating the USIC inserted in an USB virtual reader selecting the mode using C7 signal.
Figure 23:
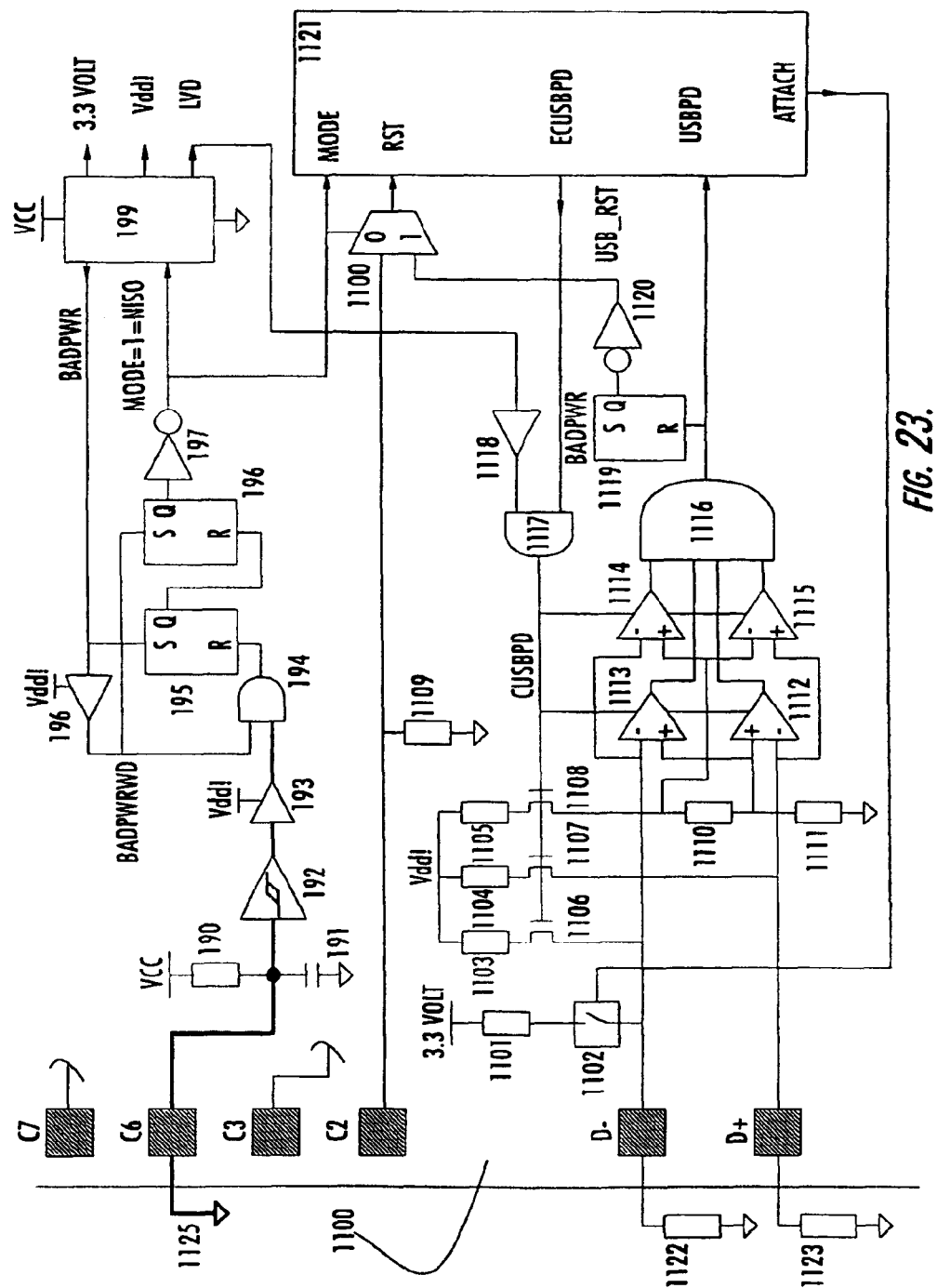
FIG. 23 is a schematic diagram illustrating the USIC inserted in an USB virtual reader selecting the mode using C6 signal.
Figure 24:
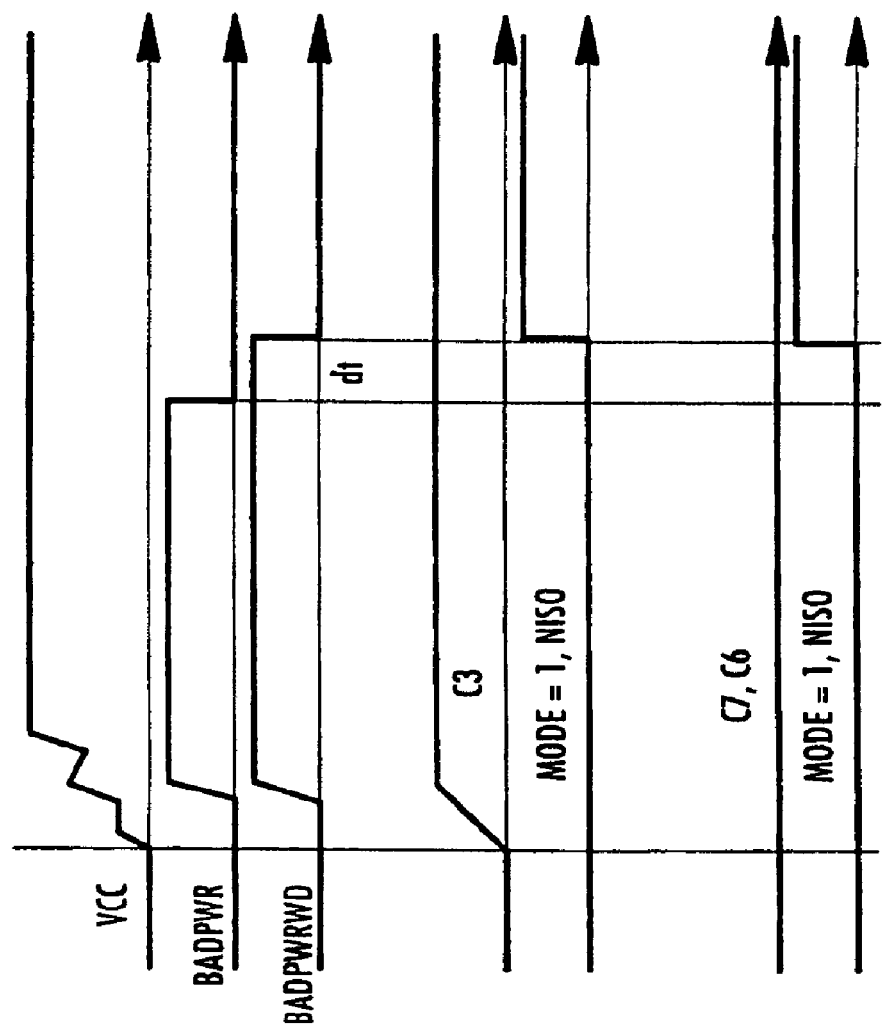
FIG. 24 is a timing diagram showing the MODE signals after power up when USIC is used in an USB virtual reader.

Turning now to FIG. 24, it summarizes what is happening in the three embodiments. The preferred embodiment of FIG. 21, when VCC is set on C1 a signal Badpwr is set to "1" until the voltage VCC is above a certain limit, example 2.8 Volt, for at least a certain period of time, example 500 is. Badpwrwd is the same signal which last approximately 4 as more. The contact C3 is at "1" because of the routing inside the virtual reader FIG. 19, not connected, and because of the pull up resistor 190. Bouncing on C3 does not disturb this embodiment. If during dt the signal at the input of 192 stays to "1" the latch 196 is reset by Q 195 and MODE=1=NISO. In the embodiment of FIG. 22, when VCC is set on C1 a signal Badpwr is set to "1" until the voltage VCC is above a certain limit, example 2.8 Volt, for at least a certain period of time, example 500 µs. Badpwrwd is the same signal which last approximately 4 µs more. The C7 contact is connected to the ground outside the virtual reader, if during dt the signal at the input of 192 stays at "0" the latch 196 is reset by Q 195 and MODE=1=NISO. In the embodiment of FIG. 23, when VCC is set on C1 a signal Badpwr is set to "1" until the voltage VCC is above a certain limit, example 2.8 Volt, for at least a certain period of time, example 500 µs. Badpwrwd is the same signal which last approximately 4 µs more. The C6 contact is connected to the ground outside the virtual reader, if during dt the signal at the input of 192 stays at "0" the latch 196 is reset by Q 195 and MODE=1=NISO.

Figure 25:
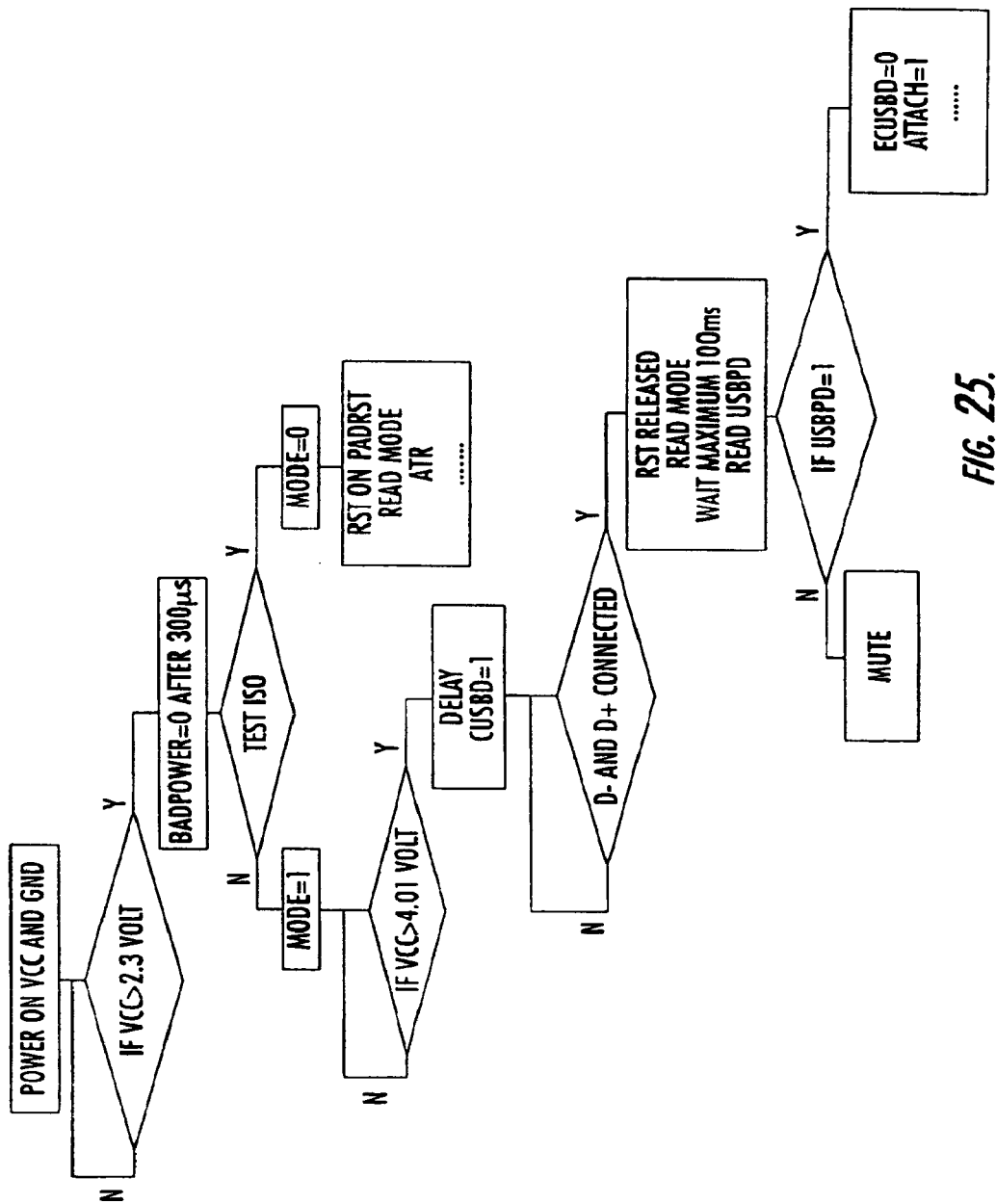
FIG. 25 is the flow diagram illustrating the general steps performed aboard a bi-mode, ISO and USB, device to select one MODE and start the CPU.
Figure 26:
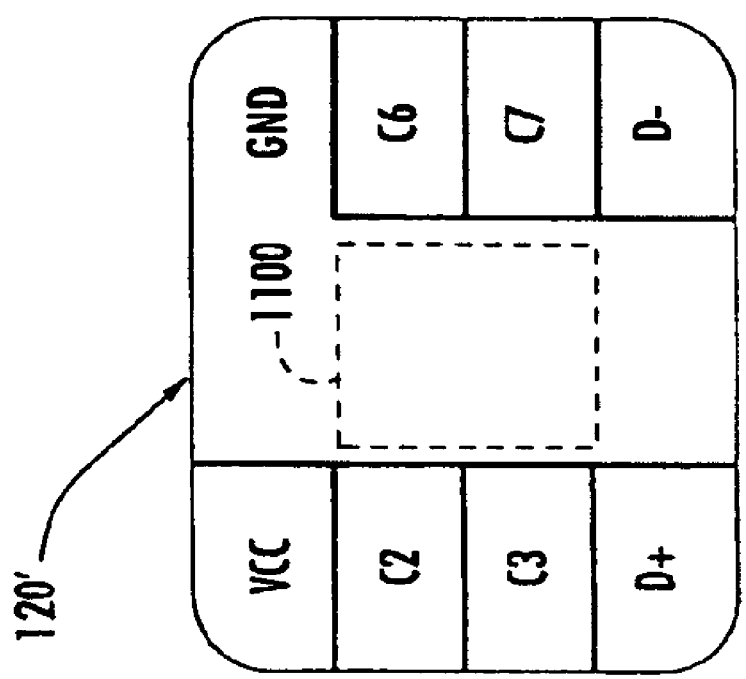
FIG. 26 is a schematic diagram illustrating the IC attached to the lead frame and wire bonded to the lead frame contacts for an USC.

Turning now to FIG. 25, a flow diagram of a USIC process is depicted. In FIG. 26, a USC module is =w represented. In that case the MODE is forced at 1. When this module is used in an ISO reader nothing happens. In an USB virtual reader, the IC will start in USB following the procedure described on FIG. 20.

Figure 28:
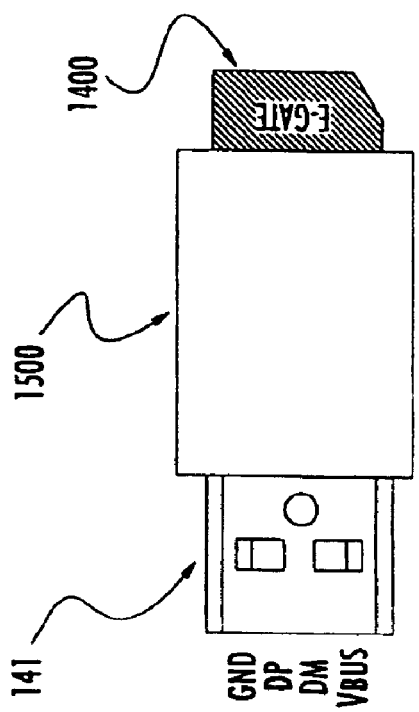
FIG. 28 is a schematic diagram illustrating the SIM plug inserted in a token compatible with a series A USB plug.
Figure 27:
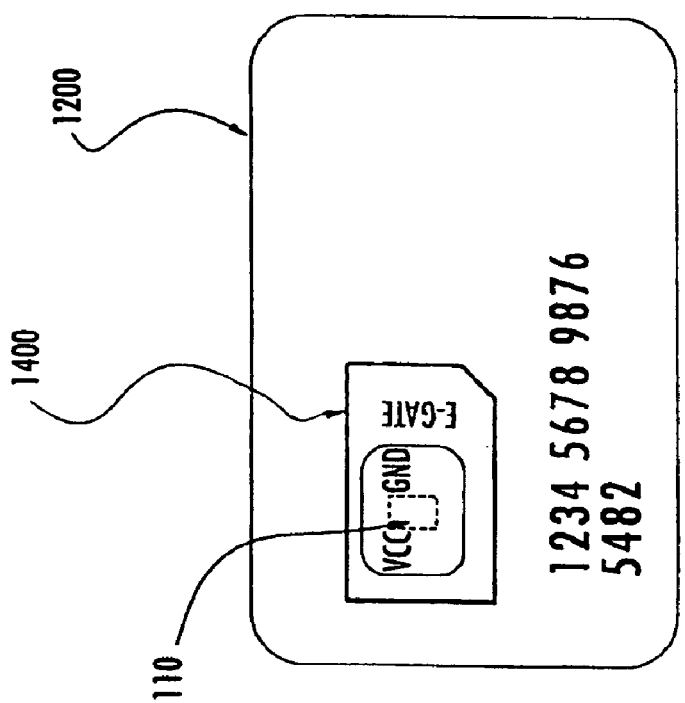
FIG. 27 is a schematic diagram illustrating the SIM plug ready to be separated from a USIC or a USC.

FIG. 27 shows a SIM card 1400 ready to be removed from the SC. The SIM card 1400 may embed a USIC or a USC module 110. Turning now to FIG. 28, a different form factor for the USB virtual reader depicted in FIG. 18 is shown. 1500 is a token reader. The SIM card 1400 is inserted in a passthrough connector 127' but not using any cable. The series A plug 141 is directly connected to the passthrough connector.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A multi-mode integrated circuit (IC) for operating in an ISO mode in accordance with International Standards Organization 7816 (ISO 7816) protocol, and a non-ISO mode in accordance with a non-ISO protocol, the multi-mode IC comprising:
   a processor;
   an external interface connected to the processor and comprising
   a voltage supply pad,
   a ground pad,
   a first set of pads in accordance with the ISO 1816 protocol, and
   a second set of pads in accordance with the non-ISO protocol; and
   a mode configuration circuit for configuring the multi-mode IC in one of the ISO mode and the non-ISO mode based upon a signal on one pad of the first set of pads.

2. A multi-mode IC according to claim 1 wherein the mode configuration circuit configures the multi-mode IC to operate in one of the ISO and non-ISO modes while disabling the other of the ISO and non-ISO modes.

3. A multi-mode IC according to claim 2 wherein the first set of pads is disabled when the multi-mode IC is configured in the non-ISO mode, and the second met of pads is disabled when the multi-mode IC is configured in the ISO mode.

4. A multi-mode IC according to claim 1 wherein the mode configuration circuit comprises:
   a mode detector connected to the one pad of the first set of pads; and
   a latching circuit connected to the processor and receiving an output from the mode detector.

5. A multi-mode IC according to claim 4 further comprising a control register connected to the latching circuit for storing a mode configuration indicator.

6. A multi-mode IC according to claim 4 further comprising a voltage detector connected to the voltage supply pad to detect a voltage supply of one of the ISO and non-ISO modes.

7. A multi-mode IC according to claim 4 wherein the non-ISO mode comprises a Universal Serial Bus (USB) mode, and the second set of pads includes D-plus and D-minus pads in accordance with the USB protocol; and further comprising a USB cable detector connected to the D-plus and D-minus pads.

8. A multi-mode IC according to claim 4 wherein the first set of pads includes a clock pad, a reset pad, and an input/output pad in accordance with the ISO 7816 protocol.

9. A multi-mode IC according to claim 4 wherein the first set of pads includes a clock pad, a reset pad, a variable supply voltage pad, and an input/output pad in accordance with the ISO 7816 protocol; and wherein the mode detector comprises a pull-up resistor connected to the one pad, of the first set of pads.

10. A multi-mode smart card for operating in an ISO mode in accordance with International Standards Organization 7816 (ISO 7816) protocol, and a non-ISO mode in accordance with a non-ISO protocol, the multi-mode smart card comprising:
    a card body; and
    a multi-mode integrated circuit (IC) carried by the card body and comprising
    an external interface including
        a voltage supply pad,
        a ground pad,
        a first set of pads in accordance with the ISO 7816 protocol, and
        a second set of pads in accordance with the non-ISO protocol, and
    a mode configuration circuit for configuring the multi-mode IC in one of the ISO mode and the non-ISO mode and comprising
        a mode detector connected to one pad of the first set of pads, and
        a latching circuit connected to the mode detector.

11. A multi-mode smart card according to claim 10 further comprising a control register connected to the latching circuit for storing a mode configuration indicator.

12. A multi-mode smart card according to claim 10 further comprising a voltage detector connected to the voltage supply pad to detect a voltage supply of one of the ISO and non-ISO modes.

13. A multi-mode smart card according to claim 10 wherein the non-ISO mode comprises a Universal Serial Bus (USB) mode, and the second set of pads includes D-plus and D-minus pads in accordance with the USB protocol; and further comprising a USB cable detector connected to the D-plus and D-minus pads.

14. A multi-mode smart card according to claim 10 wherein the mode configuration circuit configures the multi-mode IC to operate in one of the ISO and non-ISO modes while disabling the other of the ISO and non-ISO modes.

15. A multi-mode smart card according to claim 14 wherein the first set of pads is disabled when the multi-mode IC is configured in the non-ISO mode, tad the second set of pads is disabled when the multi-mode IC is configured in the ISO mode.

16. A multi-mode smart card according to claim 10 wherein the first set of pads includes a clock pad, a reset pad, and an input/output pad in accordance with the ISO 7816 protocol.

17. A multi-mode smart card according to claim 10 wherein the first set of lads includes a clock pad, a reset pad, a variable supply voltage pad, and an input/output pad in accordance with the ISO7816 protocol; and wherein the mode detector comprises a pull-up resistor connected to the one pad of the first set of pads.

18. A multi-mode smart card system for operating in an ISO mode in accordance with International Standards Organization 7816 (ISO 7816) protocol, and a non-ISO mode in accordance with a non-ISO protocol, the multi-mode smart card system comprising:
    a multi-mode smart card comprising
        an external interface including
            a voltage supply pad,
            a ground pad,
            a first set of pads in accordance with the ISO 7816 protocol, and
            a second set of pads in accordance with the non-ISO protocol, and
        a mode configuration circuit for configuring the multi-mode smart card inone of the ISO mode and the non-ISO mode and comprising
            a mode detector connected to one pad of the first set of pads, and
            a latching circuit connected to the mode detector; and
    a non-ISO-compliant smart card reader for reading the multi-mode smart card including
        a smart card interface having a plurality of contacts for respectively mating with the voltage supply pad, the ground pad, and the second set of pads in accordance with the non-ISO protocol, and
        a mode indication circuit for connection to the one pad of the first set of pads for providing a non-ISO mode indication signal to the mode detector of the mode configuration circuit.

19. A multi-mode smart card system according to claim 18 wherein the mode configuration circuit further comprises a control register connected to the latching circuit for storing a mode configuration indicator.

20. A multi-mode smart card system according to claim 16 wherein the mode configuration circuit further comprises a voltage detector connected to the voltage supply pad to detect a voltage supply of one of the ISO and non-ISO modes.

21. A multi-mode smart card system according to claim 18 wherein the non-ISO mode comprises a Universal Serial Bus (USB) mode, and the second set of pads includes D-plus and D-minus pads in accordance with the USB protocol.

22. A multi-mode smart card system according to claim 18 wherein the mode configuration circuit configures the multi-mode IC to operate in one of the ISO and non-ISO modes while disabling the other of the ISO and non-ISO modes.

23. A multi-mode smart card system according to claim 22 wherein the first set of pads is disabled when the multi-mode IC is configured in the non-ISO mode, and the second set of pads is disabled when the multi-mode IC is configured in the ISO mode.

24. A multi-mode smart card system according to claim 16 wherein the first set of pads includes a clock pad, a reset pad, ant an input/output pad in accordance with the ISO 7816 protocol.

25. A multi-mode smart card system according to claim 1B wherein the first set of pads includes a clock pad, a reset pad, a variable supply voltage pad, and an input/output pad in accordance with the ISO 7816 protocol; and wherein the mode detector comprises a pull-up resistor connected to the one pad of the first set of pads.

26. A method of operating a multi-mode integrated circuit (IC) in an ISO mode in accordance with International Standards organization 7816 (ISO 7816) protocol, and a non-ISO mode in accordance with a non-190 protocol, the multi-mode IC including an external interface having a voltage supply pad, a ground pad, a first set of pads in accordance with the ISO protocol, and a second set of pads in accordance with the non-ISO protocol, the method comprising:

detecting whether one of an ISO-mode condition and a non-ISO-mode condition exists on one pad of the first set of pads;

configuring the multi-mode IC in the ISO mode and disabling the second set of pads when the ISO-mode condition is detected; and configuring the multi-mode IC in the non-ISO mode and disabling the first set of pads when the non-ISO-mode condition is detected.

27. A method according to claim 26 wherein detecting whether one of the ISO-mode condition and the non-ISO-mode condition exists on the one pad of the first set of pads comprises detecting whether one of the ISO-mode condition and the non-ISO-mode condition exists during a power-on-reset of the multi-mode IC.

28. A method according to claim 26 further comprising verifying the non-ISO mode, when the non-ISO-mode condition is detected, by detecting a non-ISO-mode voltage on the voltage supply pad.

29. A method according to claim 26 wherein the first set of pads comprises a reset pad, a clock pad and an input/output pad in accordance with the ISO 7816 protocol.

30. A method according to claim 29 wherein detecting whether the ISO-mode or non-ISO-mode condition exists comprises detecting if a signal from one of an ISO-compliant interface and a non-ISO-compliant interface is present on the clock pad.

31. A method according to claim 26 wherein the first set of pads includes a clock pad, a reset pad, a variable supply voltage pad, and an input/output pad in accordance with the ISO 7816 protocol.

32. A method according to claim 26 wherein the non-180 protocol comprises a Universal Serial Bus (USB) protocol.

33. A method according to claim 26 further comprising storing a mode configuration indicator for indicating whether the multi-mode IC is configured in the ISO or non-ISO mode.

* * * * *

UNITED STATES PATENT AND TRADEMARK OFFICE

CERTIFICATE OF CORRECTION

PATENT NO. : 6,883,715 B1
APPLICATION NO. : 09/686327
DATED : April 26, 2005
INVENTOR(S) : Fruhauf et al.

Figure 2:
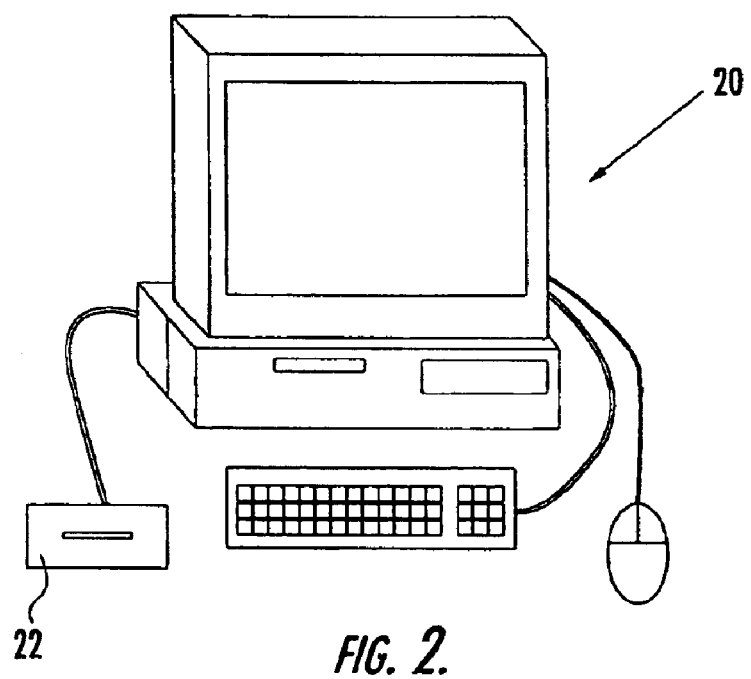
FIG. 2 is a schematic diagram of a personal computer having a smart card reader in accordance with the present invention.

It is certified that error appears in the above-identified patent and that said Letters Patent is hereby corrected as shown below:

| | |
|---|---|
| Cover page (57), Line 9 | Delete: "and 2 second"<br>Insert: -- and a second -- |
| Column 1, Line 31 | Delete: "of"<br>Insert: -- on -- |
| Column 1, Line 40 | Delete: "perform"<br>Insert: -- performing -- |
| Column 4, Line 34 | Delete: "an receiving"<br>Insert: -- a receiving -- |
| Column 7, Line 4 | Delete: "FIG. 9"<br>Insert: -- FIG. 2 -- |
| Column 7, Line 17 | Delete: "a M4 voltage"<br>Insert: -- a voltage -- |
| Column 8, Line 17 | Delete: "D-minus D-pad"<br>Insert: -- D-minus pad D- -- |
| Column 11, Line 37 | Delete: "CB"<br>Insert: -- C8 -- |
| Column 11, Line 42 | Delete: "CB"<br>Insert: -- C8 -- |
| Column 16, Line 47 | Delete: "ISO 1816"<br>Insert: -- ISO 7816 -- |
| Column 17, Line 61 | Delete: "tad"<br>Insert: -- and -- |
| Column 18, Line 2 | Delete: "lads"<br>Insert: -- pads -- |
| Column 18, Line 21 | Delete: "inone"<br>Insert: -- in one -- |

UNITED STATES PATENT AND TRADEMARK OFFICE
CERTIFICATE OF CORRECTION

PATENT NO. : 6,883,715 B1
APPLICATION NO. : 09/686327
DATED : April 26, 2005
INVENTOR(S) : Fruhauf et al.

It is certified that error appears in the above-identified patent and that said Letters Patent is hereby corrected as shown below:

Column 18, Line 58    Delete: "claim 16"
                      Insert: -- claim 18 --

Column 18, Line 63    Delete: "claim 1B"
                      Insert: -- claim 18 --

Column 19, Line 4     Delete: "non-190"
                      Insert: -- non ISO --

Column 20, Line 18    Delete: "non-180"
                      Insert: -- non ISO --

Signed and Sealed this

Nineteenth Day of December, 2006

JON W. DUDAS
*Director of the United States Patent and Trademark Office*